US012380901B2

(12) United States Patent
Guo et al.

(10) Patent No.: US 12,380,901 B2
(45) Date of Patent: Aug. 5, 2025

(54) ENCODER, DECODER, ENCODING METHOD AND DECODING METHOD FOR FREQUENCY DOMAIN LONG-TERM PREDICTION OF TONAL SIGNALS FOR AUDIO CODING

(71) Applicant: Fraunhofer-Gesellschaft zur Förderung der angewandten Forschung e.V., Munich (DE)

(72) Inventors: Ning Guo, Erlangen (DE); Bernd Edler, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/664,709

(22) Filed: May 24, 2022

(65) Prior Publication Data

US 2022/0284908 A1 Sep. 8, 2022

Related U.S. Application Data

(63) Continuation of application No. PCT/EP2019/082802, filed on Nov. 27, 2019.

(51) Int. Cl.
*G10L 19/02* (2013.01)
*G10L 19/09* (2013.01)

(52) U.S. Cl.
CPC .......... *G10L 19/0204* (2013.01); *G10L 19/09* (2013.01)

(58) Field of Classification Search
CPC . G10L 19/0204; G10L 19/005; G10L 19/093; G10L 19/167; G10L 19/09; G10L 19/02; G10L 21/04
See application file for complete search history.

(56) References Cited

U.S. PATENT DOCUMENTS 6,496,798 B1 * 12/2002 Huang .................. G10L 19/167 704/201
10,140,994 B2 * 11/2018 Sung ..................... G10L 19/005
(Continued)

FOREIGN PATENT DOCUMENTS

JP 2018511821 A 4/2018
JP 2019531505 A 10/2019
(Continued)

OTHER PUBLICATIONS

De Cheveign, Alain , et al., "Yin, a fundamental frequency estimator for speech and music", The Journal of the Acoustical Society of America, vol. 111, pp. 1917-1930, May 2002.
(Continued)

*Primary Examiner* — Paras D Shah
*Assistant Examiner* — Nadira Sultana
(74) *Attorney, Agent, or Firm* — PERKINS COIE LLP; Michael A. Glenn

(57) ABSTRACT

An encoder for encoding a current frame of an audio signal depending on one or more previous frames of the audio signal is provided. The previous frames precede the current frame, each of the current frame and the one or more previous frames having one or more harmonic components of the audio signal, each of the current frame and the one or more previous frames having a plurality of spectral coefficients in a frequency domain or in a transform domain. To generate an encoding of the current frame, the encoder is to determine an estimation of two harmonic parameters for each of the harmonic components of a most previous frame of the previous frames. Moreover, the encoder is to determine the estimation of the two harmonic parameters for each of the harmonic components of the most previous frame using a first group of three or more of the plurality of spectral
(Continued)

coefficients of each of the previous frames of the audio signal.

55 Claims, 9 Drawing Sheets

(56) References Cited

U.S. PATENT DOCUMENTS

| | | | | |
|---|---|---|---|---|
| 10,600,428 | B2 * | 3/2020 | Edler | H04N 19/635 |
| 11,562,755 | B2 * | 1/2023 | Ekstrand | G10L 19/022 |
| 11,621,009 | B2 * | 4/2023 | Villemoes | G10L 19/032 704/203 |
| 2005/0228651 | A1 | 10/2005 | Wang et al. | |
| 2008/0052068 | A1 * | 2/2008 | Aguilar | G10L 19/093 704/E19.03 |
| 2009/0216542 | A1 | 8/2009 | Pang et al. | |
| 2013/0282373 | A1 * | 10/2013 | Visser | G10L 21/0208 704/231 |
| 2014/0074461 | A1 | 3/2014 | Sung et al. | |
| 2017/0243595 | A1 | 8/2017 | Kjoerling et al. | |
| 2017/0365267 | A1 | 12/2017 | Edler et al. | |
| 2018/0075855 | A1 | 3/2018 | Nemer et al. | |
| 2019/0005967 | A1 | 1/2019 | Lecomte et al. | |

FOREIGN PATENT DOCUMENTS

| | | | | |
|---|---|---|---|---|
| KR | 20180118781 | A | 10/2018 | |
| KR | 20190045327 | A | 5/2019 | |
| RU | 2665887 | C1 | 9/2018 | |
| WO | WO-2014161991 | A2 * | 10/2014 | G10L 19/02 |
| WO | WO-2016142357 | A1 * | 9/2016 | G10L 19/02 |
| WO | WO-2016146492 | A1 * | 9/2016 | G10L 19/035 |

OTHER PUBLICATIONS

Fastl, Hugo , et al., "Psychoacoustics: "Facts and Models"", Springer-Verlag, Berlin, Heidelberg, 2006, Chapter 7.2: Just-Noticeable Changes in Frequency.

Fuchs, Hendrik , "Improving mpeg audio coding by backward adaptive linear stereo prediction", Audio Engineering Society Convention 99, Oct. 1995.

Helmrich, Christian , "Efficient Perceptual Audio Coding Using Cosine and Sine Modulated Lapped Transforms", Doctoral thesis, Friedrich-Alexander-Universität Erlangen-Nürnberg (FAU), 2017, Chapter 3.3: Frequency-Domain Prediction with Very Low Complexity.

Herre, Jürgen , et al., "Psychoacoustic models for perceptual audio coding a tutorial review", Applied Sciences, vol. 9, pp. 2854, ITT 2019.

Johnston, J.D. , "Estimation of perceptual entropy using noise masking criteria", ICASSP-88, International Conference on Acoustics, Speech, and Signal Processing, Apr. 1988, pp. 2524-2527 vol. 5.

Ojanperä, Juha , et al., "Long Term Predictor for Transform Domain Perceptual Audio Coding", Audio Engineering Society Convention 107, Sep. 1999.

Princen, John P., et al., "Analysis/synthesis filter bank design based on time domain aliasing cancellation", IEEE Transactions on Acoustics, Speech, and Signal Processing, vol. 34, No. 5, pp. 1153-1161, Oct. 1986.

Princen, J. , et al., "Subband/transform coding using filter bank designs based on time domain aliasing cancellation", ICASSP '87. IEEE International Conference on Acoustics, Speech, and Signal Processing, Oct. 1987, vol. 12, pp. 2161-2164.

Rothweiler, J. , "Polyphase quadrature filters—a new subband coding technique", ICASSP '83. IEEE International Conference on Acoustics, Speech, and Signal Processing, Apr. 1983, vol. 8, pp. 1280-1283.

Schneider, Albrecht , et al., "Perception of harmonic and inharmonic sounds: Results from ear models• in Computer Music Modeling and Retrieval. Genesis of Meaning in Sound and Music",, Sølvi Ystad, Richard Kronland-Martinet, and Kristoffer Jensen, Eds., Berlin, Heidelberg, 2009, pp. 18-44, Springer Berlin Heidelberg.

Taghipour, Armin , "Psychoacoustics of detection of tonality and asymmetry of masking: implementation of tonality estimation methods in a psychoacoustic model for perceptual audio coding, doctoral thesis", Friedrich-Alexander-Universität Erlangen-Nürnberg (FAU), 2016, Chapter 4: The Psychoacoustic model.

ETSI TS 126 447 V12.0.0, EVS Codec Error Concealment of Lost Packets, 3GPP TS26.447 version 12.0.0 Release 12, 2014.10. (82 pages).

* cited by examiner

ENCODER, DECODER, ENCODING METHOD AND DECODING METHOD FOR FREQUENCY DOMAIN LONG-TERM PREDICTION OF TONAL SIGNALS FOR AUDIO CODING

CROSS-REFERENCE TO RELATED APPLICATION

This application is a continuation of copending International Application No. PCT/EP2019/082802, filed Nov. 27, 2019, which is incorporated herein by reference in its entirety.

TECHNICAL FIELD

The present invention relates to audio signal encoding, audio signal processing, and audio signal decoding, and, in particular, to an apparatus and method for frequency domain long-term prediction of tonal signals for audio coding.

BACKGROUND OF THE INVENTION

In the audio coding field, prediction is used to remove the redundancy in audio signals. By subtracting the predicted data from the original data, and then quantizing and coding the residual that usually exhibits lower entropy, bitrate can be reduced for the transmission and the storage of the audio signal [1]. Long-Term Prediction (LTP) is one kind of prediction method aiming at removing the periodic components in audio signals [2].

In the Moving Picture Experts Group (MPEG)-2 Advanced Audio Coding (AAC) standard, Modified Discrete Cosine Transform (MDCT) is used as the Time-Frequency transform for the perceptual audio coder with backward adaptive LTP [3].

FIG. 4 illustrates a structure of a transform perceptual audio encoder with backward adaptive LTP. The audio encoder of FIG. 4 comprises a MDCT unit 410, a psychoacoustic model unit 420, a pitch estimation unit 430, a long term prediction unit 440, a quantizer 450 and a quantizer reconstruction unit 460.

As is shown in FIG. 4, the prediction unit has the reconstructed MDCT frames as input. To perform the traditional Time Domain Long-term Prediction (TDLTP), the MDCT coefficients of the reconstructed signal need to be first transformed into the time domain. The predicted time domain segment is then transformed back into the MDCT domain for residual calculation.

MDCT uses overlapped analysis windows that reduce blocking effects and still offers perfect reconstruction though the Overlap Add (OLA) procedure at the synthesis step in the inverse transform [4]. Since the alias-free reconstruction of the second half of the current frame needs the first half of the future frame [4], the prediction lag need to be carefully chosen [2].

If only fully reconstructed samples in the buffer are used for prediction, there can be integer multiple pitch periods of delay between the selected previous pitch lag and the pitch lag to be predicted. Due to the non-stationarity of audio signals, the longer delay can make the prediction less stable. For signals with high fundamental frequency, the pitch period is short, thus the negative effect of this additional delay on prediction can be more prominent.

A Frequency Domain Prediction (FDP) concept which operates directly in the MDCT domain was proposed in [5] (see also [13]). In that method each harmonic component of the tonal signal is treated individually during the prediction. A prediction of a bin in the current frame is obtained by calculating the sinusoidal progression of its spectral neighboring bins in previous frames.

However, when the frequency resolution of those MDCT coefficients is relatively low with respect to the fundamental frequency of the tonal signal, the harmonic components may overlap heavily with each other on the bins, leading to bad performance of that frequency domain approach.

SUMMARY

An embodiment may have an encoder for encoding a current frame of an audio signal depending on one or more previous frames of the audio signal, wherein the one or more previous frames precede the current frame, wherein each of the current frame and the one or more previous frames has one or more harmonic components of the audio signal, wherein each of the current frame and the one or more previous frames has a plurality of spectral coefficients in a frequency domain or in a transform domain, wherein, to generate an encoding of the current frame, the encoder is to determine an estimation of two harmonic parameters for each of the one or more harmonic components of a most previous frame of the one or more previous frames, wherein the encoder is to determine the estimation of the two harmonic parameters for each of the one or more harmonic components of the most previous frame using a first group of three or more of the plurality of spectral coefficients of each of the one or more previous frames of the audio signal.

Another embodiment may have a decoder for reconstructing a current frame of an audio signal, wherein one or more previous frames of the audio signal precedes the current frame, wherein each of the current frame and the one or more previous frames has one or more harmonic components of the audio signal, wherein each of the current frame and the one or more previous frames has a plurality of spectral coefficients in a frequency domain or in a transform domain, wherein the decoder is to receive an encoding of the current frame, wherein the decoder is to determine an estimation of two harmonic parameters for each of the one or more harmonic components of a most previous frame of the one or more previous frames, wherein the two harmonic parameters for each of the one or more harmonic components of the most previous frame depend on a first group of three or more of the plurality of reconstructed spectral coefficients for each of the one or more previous frames of the audio signal, wherein the decoder is to reconstruct the current frame depending on the encoding of the current frame and depending on the estimation of the two harmonic parameters for each of the one or more harmonic components of the most previous frame.

Another embodiment may have an apparatus for frame loss concealment, wherein one or more previous frames of the audio signal precedes a current frame of the audio signal, wherein each of the current frame and the one or more previous frames has one or more harmonic components of the audio signal, wherein each of the current frame and the one or more previous frames has a plurality of spectral coefficients in a frequency domain or in a transform domain, wherein the apparatus is to determine an estimation of two harmonic parameters for each of the one or more harmonic components of a most previous frame of the one or more previous frames, wherein the two harmonic parameters for each of the one or more harmonic components of the most previous frame depend on a first group of three or more of the plurality of reconstructed spectral coefficients for each of the one or more previous frames of the audio signal, wherein, if the apparatus does not receive the current frame, or if the current frame is received by the apparatus in a corrupted state, the apparatus is to reconstruct the current frame depending on the estimation of the two harmonic parameters for each of the one or more harmonic components of the most previous frame.

According to another embodiment, a system may have: an inventive encoder for encoding a current frame of an audio signal depending on one or more previous frames of the audio signal as mentioned above, and an inventive decoder for decoding an encoding of the current frame of the audio signal as mentioned above.

Still another embodiment may have a method for encoding a current frame of an audio signal depending on one or more previous frames of the audio signal, wherein the one or more previous frames precede the current frame, wherein each of the current frame and the one or more previous frames has one or more harmonic components of the audio signal, wherein each of the current frame and the one or more previous frames has a plurality of spectral coefficients in a frequency domain or in a transform domain, wherein, to generate an encoding of the current frame, the method has determining an estimation of two harmonic parameters for each of the one or more harmonic components of a most previous frame of the one or more previous frames, wherein determining the estimation of the two harmonic parameters for each of the one or more harmonic components of the most previous frame is conducted using a first group of three or more of the plurality of spectral coefficients of each of the one or more previous frames of the audio signal.

Another embodiment may have a method for reconstructing a current frame of an audio signal, wherein one or more previous frames of the audio signal precede the current frame, wherein each of the current frame and the one or more previous frames has one or more harmonic components of the audio signal, wherein each of the current frame and the one or more previous frames has a plurality of spectral coefficients in a frequency domain or in a transform domain, wherein the method has receiving an encoding of the current frame, wherein the method has determining an estimation of two harmonic parameters for each of the one or more harmonic components of a most previous frame of the one or more previous frames, wherein the two harmonic parameters for each of the one or more harmonic components of the most previous frame depend on a first group of three or more of the plurality of reconstructed spectral coefficients for each of the one or more previous frames of the audio signal, wherein the method has reconstructing the current frame depending on the encoding of the current frame and depending on the estimation of the two harmonic parameters for each of the one or more harmonic components of the most previous frame.

Another embodiment may have a method for frame loss concealment, wherein one or more previous frames of the audio signal precedes a current frame of the audio signal, wherein each of the current frame and the one or more previous frames has one or more harmonic components of the audio signal, wherein each of the current frame and the one or more previous frames has a plurality of spectral coefficients in a frequency domain or in a transform domain, wherein the method has determining an estimation of two harmonic parameters for each of the one or more harmonic components of a most previous frame of the one or more previous frames, wherein the two harmonic parameters for each of the one or more harmonic components of the most previous frame depend on a first group of three or more of the plurality of reconstructed spectral coefficients for each of the one or more previous frames of the audio signal, wherein the method has, if the current frame is not received, or if the current frame is received by in a corrupted state, reconstructing the current frame depending on the two harmonic parameters for each of the one or more harmonic components of the most previous frame.

Another embodiment may have a non-transitory digital storage medium having stored thereon a computer program for performing a method for encoding a current frame of an audio signal depending on one or more previous frames of the audio signal, wherein the one or more previous frames precede the current frame, wherein each of the current frame and the one or more previous frames has one or more harmonic components of the audio signal, wherein each of the current frame and the one or more previous frames has a plurality of spectral coefficients in a frequency domain or in a transform domain, wherein, to generate an encoding of the current frame, the method has determining an estimation of two harmonic parameters for each of the one or more harmonic components of a most previous frame of the one or more previous frames, wherein determining the estimation of the two harmonic parameters for each of the one or more harmonic components of the most previous frame is conducted using a first group of three or more of the plurality of spectral coefficients of each of the one or more previous frames of the audio signal, when said computer program is run by a computer.

Another embodiment may have a non-transitory digital storage medium having stored thereon a computer program for performing a method for reconstructing a current frame of an audio signal, wherein one or more previous frames of the audio signal precede the current frame, wherein each of the current frame and the one or more previous frames has one or more harmonic components of the audio signal, wherein each of the current frame and the one or more previous frames has a plurality of spectral coefficients in a frequency domain or in a transform domain, wherein the method has receiving an encoding of the current frame, wherein the method has determining an estimation of two harmonic parameters for each of the one or more harmonic components of a most previous frame of the one or more previous frames, wherein the two harmonic parameters for each of the one or more harmonic components of the most previous frame depend on a first group of three or more of the plurality of reconstructed spectral coefficients for each of the one or more previous frames of the audio signal, wherein the method has reconstructing the current frame depending on the encoding of the current frame and depending on the estimation of the two harmonic parameters for each of the one or more harmonic components of the most previous frame, when said computer program is run by a computer.

Another embodiment may have a non-transitory digital storage medium having stored thereon a computer program for performing a method for frame loss concealment, wherein one or more previous frames of the audio signal precedes a current frame of the audio signal, wherein each of the current frame and the one or more previous frames has one or more harmonic components of the audio signal, wherein each of the current frame and the one or more previous frames has a plurality of spectral coefficients in a frequency domain or in a transform domain, wherein the method has determining an estimation of two harmonic parameters for each of the one or more harmonic components of a most previous frame of the one or more previous frames, wherein the two harmonic parameters for each of the one or more harmonic components of the most previous frame depend on a first group of three or more of the plurality of reconstructed spectral coefficients for each of the one or more previous frames of the audio signal, wherein the method has, if the current frame is not received, or if the current frame is received by in a corrupted state, reconstructing the current frame depending on the two harmonic parameters for each of the one or more harmonic components of the most previous frame, when said computer program is run by a computer.

An encoder for encoding a current frame of an audio signal depending on one or more previous frames of the audio signal according to an embodiment is provided. The one or more previous frames precede the current frame, wherein each of the current frame and the one or more previous frames comprises one or more harmonic components of the audio signal, wherein each of the current frame and the one or more previous frames comprises a plurality of spectral coefficients in a frequency domain or in a transform domain. To generate an encoding of the current frame, the encoder is to determine an estimation of two harmonic parameters for each of the one or more harmonic components of a most previous frame of the one or more previous frames. Moreover, the encoder is to determine the estimation of the two harmonic parameters for each of the one or more harmonic components of the most previous frame using a first group of three or more of the plurality of spectral coefficients of each of the one or more previous frames of the audio signal.

Moreover, a decoder for reconstructing a current frame of an audio signal according to an embodiment is provided. One or more previous frames of the audio signal precede the current frame, wherein each of the current frame and the one or more previous frames comprises one or more harmonic components of the audio signal, wherein each of the current frame and the one or more previous frames comprises a plurality of spectral coefficients in a frequency domain or in a transform domain. The decoder is to receive an encoding of the current frame. The decoder is to determine an estimation of two harmonic parameters for each of the one or more harmonic components of a most previous frame of the one or more previous frames. The two harmonic parameters for each of the one or more harmonic components of the most previous frame depend on a first group of three or more of the plurality of reconstructed spectral coefficients for each of the one or more previous frames of the audio signal. Moreover, the decoder is to reconstruct the current frame depending on the encoding of the current frame and depending on the estimation of the two harmonic parameters for each of the one or more harmonic components of the most previous frame.

Moreover, an apparatus for frame loss concealment according to an embodiment is provided. One or more previous frames of the audio signal precede a current frame of the audio signal. Each of the current frame and the one or more previous frames comprises one or more harmonic components of the audio signal, wherein each of the current frame and the one or more previous frames comprises a plurality of spectral coefficients in a frequency domain or in a transform domain. The apparatus is to determine an estimation of two harmonic parameters for each of the one or more harmonic components of a most previous frame of the one or more previous frames, wherein the two harmonic parameters for each of the one or more harmonic components of the most previous frame depend on a first group of three or more of the plurality of reconstructed spectral coefficients for each of the one or more previous frames of the audio signal. If the apparatus does not receive the current frame, or if the current frame is received by the apparatus in a corrupted state, the apparatus is to reconstruct the current frame depending on the estimation of the two harmonic parameters for each of the one or more harmonic components of the most previous frame.

Furthermore, a method for encoding a current frame of an audio signal depending on one or more previous frames of the audio signal according to an embodiment is provided. The one or more previous frames precede the current frame. Each of the current frame and the one or more previous frames comprises one or more harmonic components of the audio signal. Each of the current frame and the one or more previous frames comprises a plurality of spectral coefficients in a frequency domain or in a transform domain. To generate an encoding of the current frame, the method comprises determining an estimation of two harmonic parameters for each of the one or more harmonic components of a most previous frame of the one or more previous frames. Determining the estimation of the two harmonic parameters for each of the one or more harmonic components of the most previous frame is conducted using a first group of three or more of the plurality of spectral coefficients of each of the one or more previous frames of the audio signal.

Moreover, a method for reconstructing a current frame of an audio signal according to an embodiment is provided. One or more previous frames of the audio signal precede the current frame. Each of the current frame and the one or more previous frames comprises one or more harmonic components of the audio signal. Each of the current frame and the one or more previous frames comprises a plurality of spectral coefficients in a frequency domain or in a transform domain. The method comprises receiving an encoding of the current frame. Moreover, the method comprises determining an estimation of two harmonic parameters for each of the one or more harmonic components of a most previous frame of the one or more previous frames, wherein the two harmonic parameters for each of the one or more harmonic components of the most previous frame depend on a first group of three or more of the plurality of reconstructed spectral coefficients for each of the one or more previous frames of the audio signal. Furthermore, the method comprises reconstructing the current frame depending on the encoding of the current frame and depending on the estimation of the two harmonic parameters for each of the one or more harmonic components of the most previous frame.

Furthermore, a method for frame loss concealment according to an embodiment is provided. One or more previous frames of the audio signal precede a current frame of the audio signal, wherein each of the current frame and the one or more previous frames comprises one or more harmonic components of the audio signal, wherein each of the current frame and the one or more previous frames comprises a plurality of spectral coefficients in a frequency domain or in a transform domain. The method comprises determining an estimation of two harmonic parameters for each of the one or more harmonic components of a most previous frame of the one or more previous frames, wherein the two harmonic parameters for each of the one or more harmonic components of the most previous frame depend on a first group of three or more of the plurality of reconstructed spectral coefficients for each of the one or more previous frames of the audio signal.

Moreover, the method comprises, if the current frame is not received, or if the current frame is received by in a corrupted state, reconstructing the current frame depending on the two harmonic parameters for each of the one or more harmonic components of the most previous frame.

Moreover, a computer program according to an embodiment for implementing one of the above-described methods, when the computer program is executed by a computer or signal processor is provided.

Long-Term Prediction (LTP) is traditionally used to predict signals that have certain periodicity in the time domain. In the case of transform coding with backward adaptation in an audio coder, the decoder unit has, in general, only the frequency coefficients at hand, an inverse transform is thus needed before the prediction. Embodiments provide Frequency Domain Least Mean Square Prediction (FDLMSP) concepts, which operate directly in the Modified Discrete Cosine Transform (MDCT) domain, and which, e.g., reduce prominently the bitrate for audio coding, even under very low frequency resolution. Thus, some embodiments may, e.g., be employed in a transform codec to enhance the coding efficiency, especially in low-delay audio coding scenarios.

Some embodiments provide a Frequency Domain Least Mean Square Prediction (FDLMSP) concept, that performs LTP directly in the MDCT domain. However, instead of doing prediction individually on each bin, this new concept models the harmonic components of a tonal signal in the transform domain using a real-valued linear equation system. The prediction is done after Least Mean Squares (LMS)-solving the linear equation system. The parameters of the harmonics are then used to predict the current frame, based on the phase progression nature of harmonics. It should be noted that this prediction concept can also be applied to other real-valued linear transforms or filterbanks, such as different types of Discrete Cosine Transform (DCT) or the Polyphase Quadrature Filter (POF) [6].

In the following, the signal model is presented, the harmonic components estimation and the prediction process are explained in detail, experiments to evaluate the FDLMSP concept with comparison to TDLTP and FDP are described and the results are shown and discussed.

BRIEF DESCRIPTION OF THE DRAWINGS

In the following, embodiments of the present invention are described in more detail with reference to the figures, in which.

DETAILED DESCRIPTION OF THE INVENTION

Figure 1:
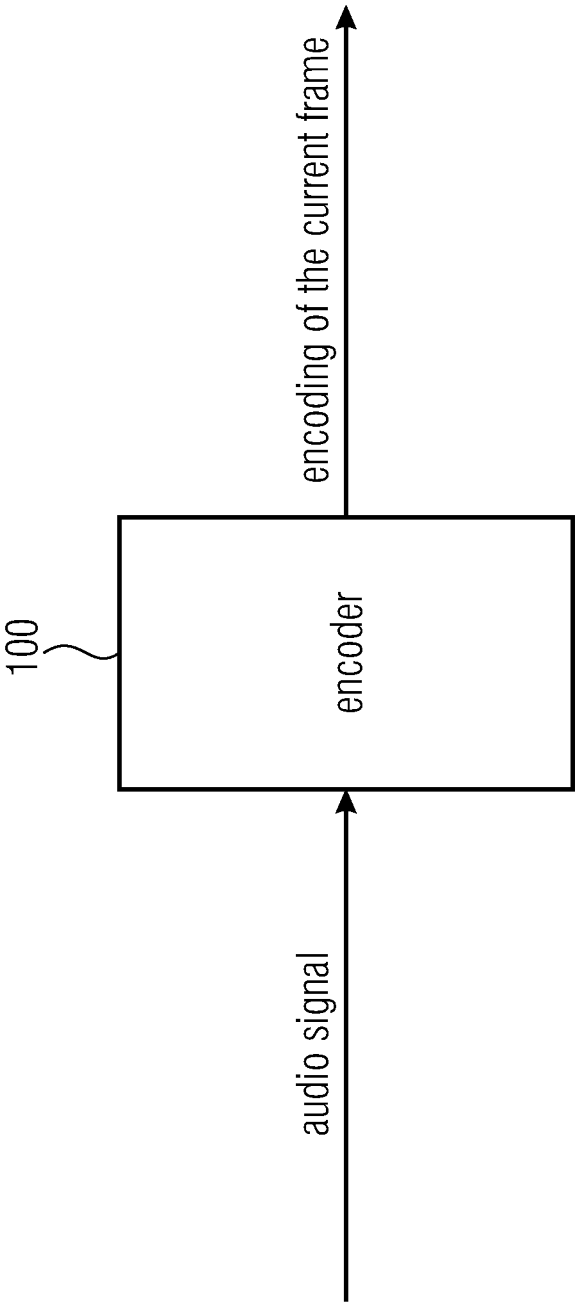
FIG. 1 illustrates an encoder for encoding a current frame of an audio signal depending on one or more previous frames of the audio signal according to an embodiment.

FIG. 1 illustrates an encoder 100 for encoding a current frame of an audio signal depending on one or more previous frames of the audio signal according to an embodiment.

The one or more previous frames precede the current frame, wherein each of the current frame and the one or more previous frames comprises one or more harmonic components of the audio signal, wherein each of the current frame and the one or more previous frames comprises a plurality of spectral coefficients in a frequency domain or in a transform domain.

To generate an encoding of the current frame, the encoder 100 is to determine an estimation of two harmonic parameters for each of the one or more harmonic components of a most previous frame of the one or more previous frames. Moreover, the encoder 100 is to determine the estimation of the two harmonic parameters for each of the one or more harmonic components of the most previous frame using a first group of three or more of the plurality of spectral coefficients of each of the one or more previous frames of the audio signal.

The most previous frame may, e.g., be most previous with respect to the current frame.

The most previous frame may, e.g., be (referred to as) an immediately preceding frame. The immediately preceding frame may, e.g., immediately precede the current frame.

The current frame comprises one or more harmonic components of the audio signal. Each of the one or more previous frames might comprise one or more harmonic components of the audio signal. The fundamental frequency of the one or more harmonic components in the current frame and the one or more previous frames are assumed the same.

According to an embodiment, the encoder 100 may, e.g., be configured to estimate the two harmonic parameters for each of the one or more harmonic components of the most previous frame without using a second group of one or more further spectral coefficients of the plurality of spectral coefficients of each of the one or more previous frames.

According to an embodiment, the encoder 100 may, e.g., be configured to determine a gain factor and a residual signal as the encoding of the current frame depending on a fundamental frequency of the one or more harmonic components of the current frame and the one or more previous frames and depending on the estimation of the two harmonic parameters for each of the one or more harmonic components of the most previous frame. The encoder 100 may, e.g., be configured to generate the encoding of the current frame such that the encoding of the current frame comprises the gain factor and the residual signal.

In an embodiment, the encoder 100 may, e.g., be configured to determine an estimation of the two harmonic parameters for each of the one or more harmonic components of the current frame depending on the estimation of the two harmonic parameters for each of the one or more harmonic components of the most previous frame and depending on the fundamental frequency of the one or more harmonic components of the current frame and the one or more previous frames. The fundamental frequency may, e.g., be assumed unchanged over the current frame and the one or more previous frames, According to an embodiment, the two harmonic parameters for each of the one or more harmonic components are a first parameter for a cosinus sub-component and a second parameter for a sinus sub-component for each of the one or more harmonic components.

In an embodiment, the encoder 100 may, e.g., be configured to estimate the two harmonic parameters for each of the one or more harmonic components of the most previous frame by solving a linear equation system comprising at least three equations, wherein each of the at least three equations depends on a spectral coefficient of the first group of the three or more of the plurality of spectral coefficients of each of the one or more previous frames.

According to an embodiment, the encoder 100 may, e.g., be configured to solve the linear equation system using a least mean squares algorithm.

According to an embodiment, the linear equation system is defined by $$X_{m-1}(\Lambda)=U\cdot p\in\mathbb{R}^{(\gamma_H-\gamma_1+2r+1)\times 1}$$

wherein $$\Lambda=[\gamma_1-r, \ldots, \gamma_H-r]\in\mathbb{R}^{(\gamma_H-\gamma_1+2r+1)\times 1}$$

wherein $\gamma_1$ indicates a first spectral band of one of the one or more harmonic components of the most previous frame having a lowest harmonic component frequency among the one or more harmonic components, wherein $\gamma_H$ indicates a second spectral band of one of the one or more harmonic components of the most previous frame having a highest harmonic component frequency among the one or more harmonic components, wherein r is an integer number with $r\geq 0$.

In an embodiment, $r\geq 1$.

According to an embodiment, $$U=[U_1, U_2, \ldots, U_H]\in\mathbb{R}^{(\gamma_H-\gamma_1+2r+1)\times 2H}$$

$$p=[p_1, p_2, \ldots, p_H]^T\in\mathbb{R}^{2H\times 1}$$

wherein $$p_h=[a_h, b_h]^T\in\mathbb{R}^{2\times 1}$$

wherein $a_h$ is a parameter for a cosinus sub-component for an h-th harmonic component of the most previous frame, wherein $b_h$ is a parameter for a sinus sub-component for the h-th harmonic component of the most previous frame, wherein, for each integer value with $1\leq h\leq H$:

$$U_h=\frac{F(\Upsilon_1)}{2}\left[\cos\left(\frac{3N\Upsilon_1}{2}\right)\cdot\sin\left(\frac{3N\Upsilon_1}{2}\right)\right]+\frac{F(\Upsilon_2)}{2}\left[\cos\left(\frac{3N\Upsilon_2}{2}\right)\cdot\sin\left(\frac{3N\Upsilon_2}{2}\right)\right]\in\mathbb{R}^{(2r+1)\times 2},$$

wherein $$\Upsilon_1=\omega_h-\kappa_{\Gamma_h}^T\in\mathbb{R}^{(2r+1)\times 1},$$

$$\Upsilon_2=\omega_h+\kappa_{\Gamma_h}^T\in\mathbb{R}^{(2r+1)\times 1},$$

wherein $$F(\lambda)=\mathcal{DFT}\{f(n)\}e^{j\lambda(N-0.5)}$$

wherein $f(n)$ is a window function in a time domain, wherein DFT is Discrete Fourier Transform, wherein $$\kappa_k=\frac{\pi}{N}\left(k+\frac{1}{2}\right),$$

wherein $$w_h=h\cdot\frac{2\pi f_0}{f_s},$$

wherein $f_0$ is the fundamental frequency of the one or more harmonic components of the current frame and one or more previous frames, wherein $f_s$ is a sampling frequency, and wherein N depends on a length of a transform block for transforming the time-domain audio signal into the frequency domain or into the spectral domain.

In an embodiment, the linear equation system is solvable according to:

$$\tilde{p}=U^{+}\cdot X_{m-1}(\Lambda)$$

wherein $\tilde{p}$ is a first vector comprising an estimation of the two harmonic parameters for each of the one or more harmonic components of the most previous frame, wherein $X_{m-1}(\Lambda)$ is a second vector comprising the first group of the three or more of the plurality of spectral coefficients of each of the one or more previous frames, wherein $U^{+}$ is a Moore-Penrose inverse matrix of $U=[U_1, U_2, \ldots, U_H]$, wherein U comprises a number of third matrices or third vectors, wherein each of the third matrices or third vectors together with the estimation of the two harmonic parameters for a harmonic component of the one or more harmonic components of the most previous frame indicates an estimation of said harmonic component, wherein H indicates a number of the harmonic components of the one or more previous frames.

In an embodiment, the encoder 100 may, e.g., be to encode a fundamental frequency of harmonic components, a window function, the gain factor and the residual signal.

According to an embodiment, the encoder 100 may, e.g., be configured to determine the number of the one or more harmonic components of the most previous frame and a fundamental frequency of the one or more harmonic components of the most previous frame before estimating the two harmonic parameters for each of the one or more harmonic components of the most previous frame using a first group of three or more of the plurality of spectral coefficients of each of the one or more previous frames of the audio signal.

According to an embodiment, the encoder 100 may, e.g., be configured to determine one or more groups of harmonic components from the one or more harmonic components, and to apply a prediction of the audio signal on the one or more groups of harmonic components, wherein the encoder 100 may, e.g., be configured to encode the order for each of the one or more groups of harmonic components of the most previous frame.

In an embodiment, the encoder 100 may, e.g., be configured to apply:

$$c_h=a_h\cos(\omega_h N)+b_h\sin(\omega_h N), \text{ and}$$

wherein the encoder 100 may, e.g., be configured to apply:

$$d_h=a_h\sin(\omega_h N)+b_h\cos(\omega_h N)$$

wherein $a_h$ is a parameter for a cosinus sub-component for the h-th harmonic component of said one or more harmonic components of the most previous frame, wherein $b_h$ is a parameter for a sinus sub-component for the h-th harmonic component of said one or more harmonic components of the most previous frame, wherein $c_h$ is a parameter for a cosinus sub-component for the h-th harmonic component of said one or more harmonic components of the current frame, wherein $d_h$ is a parameter for a sinus sub-component for the h-th harmonic component of said one or more harmonic components of the current frame, wherein N depends on a length of a transform block for transforming the time-domain audio signal into the frequency domain or into the spectral domain, and wherein $$w_h = h \cdot \frac{2\pi f_0}{f_s},$$

wherein $f_0$ is the fundamental frequency of the one or more harmonic components of the most previous frame, being a fundamental frequency of the one or more harmonic components of the current frame, wherein $f_s$ is a sampling frequency, and wherein h is an index indicating one of the one or more harmonic components of the most previous frame.

According to an embodiment, the encoder 100 may, e.g., be configured to determine a residual signal depending on the plurality of spectral coefficients of the current frame in the frequency domain or in the transform domain and depending on the estimation of the two harmonic parameters for each of the one or more harmonic components of the current frame, and wherein the encoder 100 may, e.g., be configured to encode the residual signal.

In an embodiment, the encoder 100 may, e.g., be configured to determine a spectral prediction of one or more of the plurality of spectral coefficients of the current frame depending on the estimation of the two harmonic parameters for each of the one or more harmonic components of the current frame. The encoder 100 may, e.g., be configured to determine the residual signal and a gain factor depending on the plurality of spectral coefficients of the current frame in the frequency domain or in the transform domain and depending on the spectral prediction of the three or more of the plurality of spectral coefficients of the current frame; wherein the encoder 100 may, e.g., be configured to generate the encoding of the current frame such that the encoding of the current frame comprises the residual signal and the gain factor.

According to an embodiment, the encoder 100 may, e.g., be configured to determine the residual signal of the current frame according to:

$$R_m(k)=X_m(k)-g\tilde{X}_m(k), 0 \le k \le N.$$

wherein m is a frame index, wherein k is a frequency index, wherein $R_m(k)$ indicates a k-th sample of the residual signal in the spectral domain or in the transform domain, wherein $X_m(k)$ indicates a k-th sample of the spectral coefficients of the current frame in the spectral domain or in the transform domain, wherein $\tilde{X}_m(k)$ indicates a k-th sample of the spectral prediction of the current frame in the spectral domain or in the transform domain, and wherein g is a gain factor.

Figure 2:
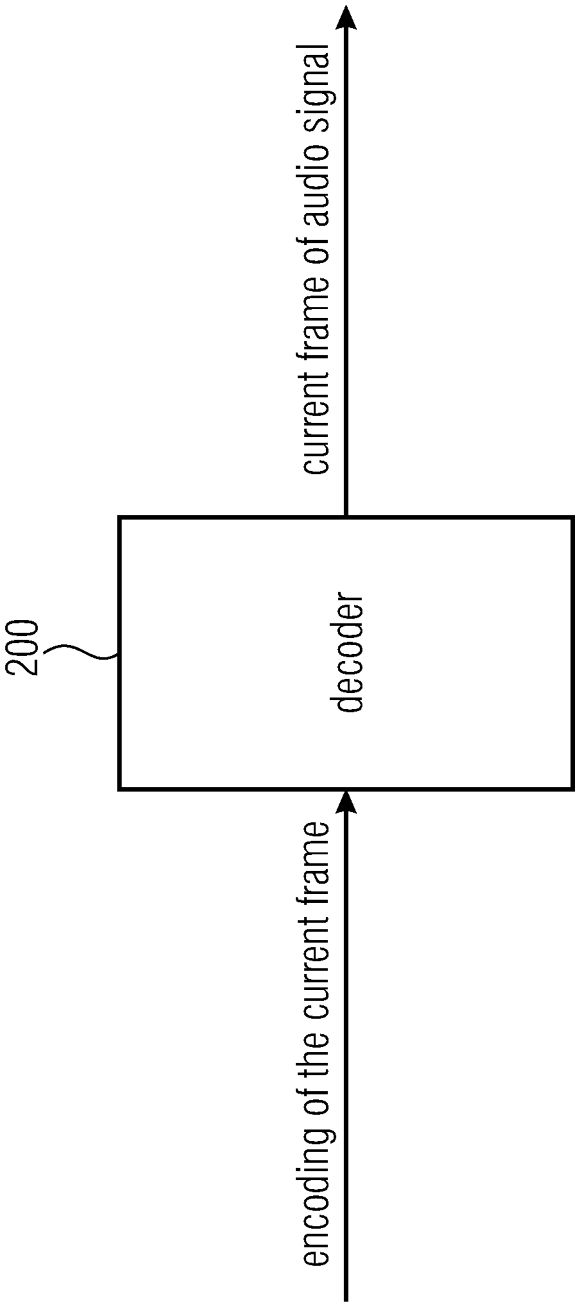
FIG. 2 illustrates a decoder for decoding an encoding of a current frame of an audio signal according to an embodiment.

FIG. 2 illustrates a decoder 200 for reconstructing a current frame of an audio signal according to an embodiment.

One or more previous frames of the audio signal precede the current frame, wherein each of the current frame and the one or more previous frames comprises one or more harmonic components of the audio signal, wherein each of the current frame and the one or more previous frames comprises a plurality of spectral coefficients in a frequency domain or in a transform domain.

The decoder 200 is to receive an encoding of the current frame.

Moreover, the decoder 200 is to determine an estimation of two harmonic parameters for each of the one or more harmonic components of a most previous frame of the one or more previous frames. The two harmonic parameters for each of the one or more harmonic components of the most previous frame depend on a first group of three or more of the plurality of reconstructed spectral coefficients for each of the one or more previous frames of the audio signal.

Furthermore, the decoder 200 is to reconstruct the current frame depending on the encoding of the current frame and depending on the estimation of the two harmonic parameters for each of the one or more harmonic components of the most previous frame.

The most previous frame may, e.g., be most previous with respect to the current frame.

The most previous frame may, e.g., be (referred to as) an immediately preceding frame. The immediately preceding frame may, e.g., immediately precede the current frame.

The current frame comprises one or more harmonic components of the audio signal. Each of the one or more previous frames might comprise one or more harmonic components of the audio signal. The fundamental frequency of the one or more harmonic components in the current frame and the one or more previous frames are assumed the same.

According to an embodiment, the two harmonic parameters for each of the one or more harmonic components of the most previous frame do not depend on a second group of one or more further spectral coefficients of the plurality of spectral coefficients of the one of more previous frames.

In an embodiment, the decoder 200 may, e.g., be to determine an estimation of the two harmonic parameters for each of the one or more harmonic components of the current frame depending on the estimation of the two harmonic parameters for each of the one or more harmonic components of the most previous frame and depending on the fundamental frequency of the one or more harmonic components of the current frame and the one or more previous frames.

According to an embodiment, the decoder 100 may, e.g., be configured to receive the encoding of the current frame comprising a gain factor and a residual signal. The decoder 200 may, e.g., be configured to reconstruct the current frame depending on the gain factor, depending on the residual signal and depending on a fundamental frequency of the one or more harmonic components of the current frame and the one or more previous frames. The fundamental frequency may, e.g., be assumed unchanged over the current frame and the one or more previous frame.

According to an embodiment, the two harmonic parameters for each of the one or more harmonic components are a first parameter for a cosinus sub-component and a second parameter for a sinus sub-component for each of the one or more harmonic components.

In an embodiment, the two harmonic parameters for each of the one or more harmonic components of the most previous frame depend on a linear equation system comprising at least three equations, wherein each of the at least three equations depends on a spectral coefficient of the first group of the three or more of the plurality of reconstructed spectral coefficients for each of the one or more previous frames.

According to an embodiment, the linear equation system is solvable using a least mean squares algorithm.

According to an embodiment, the linear equation system is defined by $$X_{m-1}(\Lambda)=U \cdot p \in \mathbb{R}^{(\gamma_H-\gamma_1+2r+1)\times 1}$$

wherein $$\Lambda=[\gamma_1-r, \ldots, \gamma_H-r] \in \mathbb{R}^{(\gamma_H-\gamma_1+2r+1)\times 1}$$

wherein $\gamma_1$ indicates a first spectral band of one of the one or more harmonic components of the most previous frame having a lowest harmonic component frequency among the one or more harmonic components, wherein $\gamma_H$ indicates a second spectral band of one of the one or more harmonic components of the most previous frame having a highest harmonic component frequency among the one or more harmonic components, wherein r is an integer number with r≥0.

In an embodiment, r≥1.

According to an embodiment, $$U=[U_1,U_2, \ldots ,U_H]\in \mathbb{R}^{(\gamma_H-\gamma_1+2r+1)\times 2H}$$

$$p=[p_1,p_2, \ldots ,p_H]^T\in \mathbb{R}^{2H\times 1}$$

wherein $$p_h=[a_h,b_h]^T\in \mathbb{R}^{2\times 1}$$

wherein $a_h$ is a parameter for a cosinus sub-component for an h-th harmonic component of the most previous frame, wherein $b_h$ is a parameter for a sinus sub-component for the h-th harmonic component of the most previous frame, wherein, for each integer value with 1≤h≤H:

$$U_h = \frac{F(\Upsilon_1)}{2}\left[\cos\left(\frac{3N\Upsilon_1}{2}\right)\cdot \sin\left(\frac{3N\Upsilon_1}{2}\right)\right] + \frac{F(\Upsilon_2)}{2}\left[\cos\left(\frac{3N\Upsilon_2}{2}\right)\cdot \sin\left(\frac{3N\Upsilon_2}{2}\right)\right] \in \mathbb{R}^{(2r+1)\times 2},$$

wherein $$\Upsilon_1 = \omega_h - \kappa_{\Gamma_h}^T \in \mathbb{R}^{(2r+1)\times 1},$$

$$\Upsilon_2 = \omega_h + \kappa_{\Gamma_h}^T \in \mathbb{R}^{(2r+1)\times 1},$$

wherein $$F(\lambda) = \mathcal{DFT}\{f(n)\}e^{j\lambda(N-0.5)}$$

wherein $f(n)$ is a window function in a time domain, wherein DFT is Discrete Fourier Transform, wherein $$\kappa_k = \frac{\pi}{N}\left(k + \frac{1}{2}\right),$$

wherein $$w_h = h\cdot \frac{2\pi f_0}{f_s},$$

wherein $f_0$ is the fundamental frequency of the one or more harmonic components of the current frame and the one or more previous frames, wherein $f_s$ is a sampling frequency, and wherein N depends on a length of a transform block for transforming the time-domain audio signal into the frequency domain or into the spectral domain.

In an embodiment, the linear equation system is solvable according to:

$$\tilde{p}=U^{+}\cdot X_{m-1}(\Lambda)$$

wherein $\tilde{p}$ is a first vector comprising an estimation of the two harmonic parameters for each of the one or more harmonic components of the most previous frame, wherein $X_{m-1}(\Lambda)$ is a second vector comprising the first group of the three or more of the plurality of reconstructed spectral coefficients for each of the one or more previous frames, wherein $U^+$ is a Moore-Penrose inverse matrix of $U=[U_1, U_2, \ldots, U_H]$, wherein U comprises a number of third matrices or third vectors, wherein each of the third matrices or third vectors together with the estimation of the two harmonic parameters for a harmonic component of the one or more harmonic components of the most previous frame indicates an estimation of said harmonic component, wherein H indicates a number of the harmonic components of the one or more previous frames.

In an embodiment, wherein the decoder 200 may, e.g., be configured to receive a fundamental frequency of harmonic components, a window function, the gain factor and the residual signal. The decoder 200 may, e.g., be configured to reconstruct the current frame depending on a fundamental frequency of the one or more harmonic components of the most previous frame, depending on the order of the harmonic components, depending on the window function, depending on the gain factor and depending on the residual signal.

Only the fundamental frequency, the order of harmonic components, the window function, the gain factor and the residual need to be transmitted. The decoder 200 may, e.g., calculate U based on this received information, and then conduct the harmonic parameters estimation and current frame prediction. The decoder may, e.g., then reconstruct the current frame by adding the transmitted residual spectra to the predicted spectra, scaled by the transmitted gain factor.

According to an embodiment, the decoder 200 may, e.g., be configured to receive the number of the one or more harmonic components of the most previous frame and a fundamental frequency of the one or more harmonic components of the most previous frame. The decoder 200 may, e.g., be configured to decode the encoding of the current frame depending on the number of the one or more harmonic components of the most previous frame and depending on the fundamental frequency of the one or more harmonic components of the current frame and the one or more previous frames.

According to an embodiment, the decoder 200 is to decode the encoding of the current frame depending on one or more groups of harmonic components, wherein the decoder 200 is to apply a prediction of the audio signal on the one or more groups of harmonic components.

According to an embodiment the decoder 200 may, e.g., be configured to determine the two harmonic parameters for each of the one or more harmonic components of the current frame depending on the two harmonic parameters for each of said one of the one or more harmonic components of the most previous frame.

In an embodiment, $$c_h=a_h \cos(\omega_h N)+b_h \sin(\omega_h N), \text{ and}$$

wherein the decoder 200 may, e.g., be configured to apply:

$$d_h=a_h \sin(\omega_h N)+b_h \cos(\omega_h N),$$

wherein $a_h$ is a parameter for a cosinus sub-component for the h-th harmonic component of said one or more harmonic components of the most previous frame, wherein $b_h$ is a parameter for a sinus sub-component for the h-th harmonic component of said one or more harmonic components of the most previous frame, wherein $c_h$ is a parameter for a cosinus sub-component for the h-th harmonic component of said one or more harmonic components of the current frame, wherein $d_h$ is a parameter for a sinus sub-component for the h-th harmonic component of said one or more harmonic components of the current frame, wherein N depends on a length of a transform block for transforming the time-domain audio signal into the frequency domain or into the spectral domain, and wherein $$w_h = h \cdot \frac{2\pi f_0}{f_s},$$

wherein $f_0$ is the fundamental frequency of the one or more harmonic components of the most previous frame, being a fundamental frequency of the one or more harmonic components of the current frame, wherein $f_s$ is a sampling frequency, and wherein h is an index indicating one of the one or more harmonic components of the most previous frame.

According to an embodiment, the decoder 200 may, e.g., be configured to receive a residual signal, wherein the residual signal depends on the plurality of spectral coefficients of the current frame in the frequency domain or in the transform domain, and wherein the residual signal depends on the estimation of the two harmonic parameters for each of the one or more harmonic components of the current frame.

In an embodiment, the decoder 200 may, e.g., be configured to determine a spectral prediction of one or more of the plurality of spectral coefficients of the current frame depending on the estimation of the two harmonic parameters for each of the one or more harmonic components of the current frame, and wherein the decoder 200 may, e.g., be configured to determine the current frame of the audio signal depending on the spectral prediction of the current frame and depending on the residual signal and depending on a gain factor.

According to an embodiment, wherein the residual signal of the current frame is defined according to:

$$\hat{X}_m(k)=\hat{R}_m(k)+g\check{X}_m(k)$$

wherein m is a frame index, wherein k is a frequency index, wherein $\hat{R}_m(k)$ is the received residual after quantization reconstruction, wherein $\hat{X}_m(k)$ is the reconstructed current frame, wherein $\check{X}_m(k)$ indicates the spectral prediction of the current frame in the spectral domain or in the transform domain, and wherein g is the gain factor.

Figure 3:
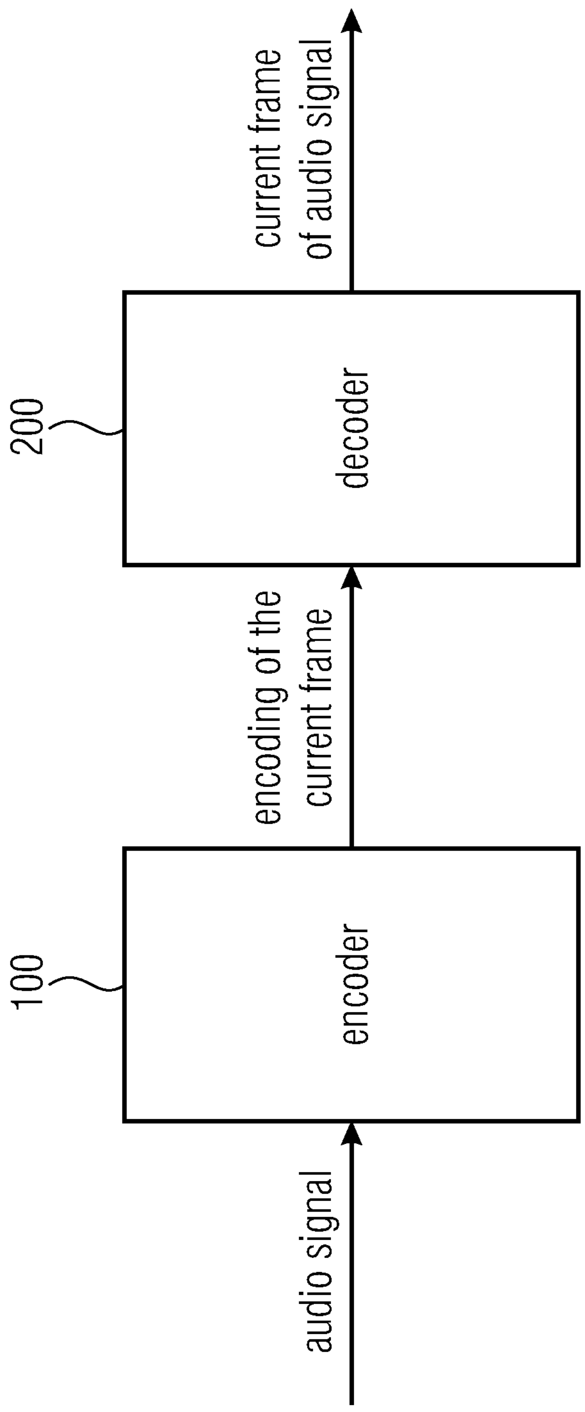
FIG. 3 illustrates a system according to an embodiment.

FIG. 3 illustrates a system according to an embodiment.

The system comprises an encoder 100 according to one of the above-described embodiments for encoding a current frame of an audio signal.

Moreover, the system comprises a decoder 200 according to one of the above-described embodiments for decoding an encoding of the current frame of the audio signal.

Figure 7:
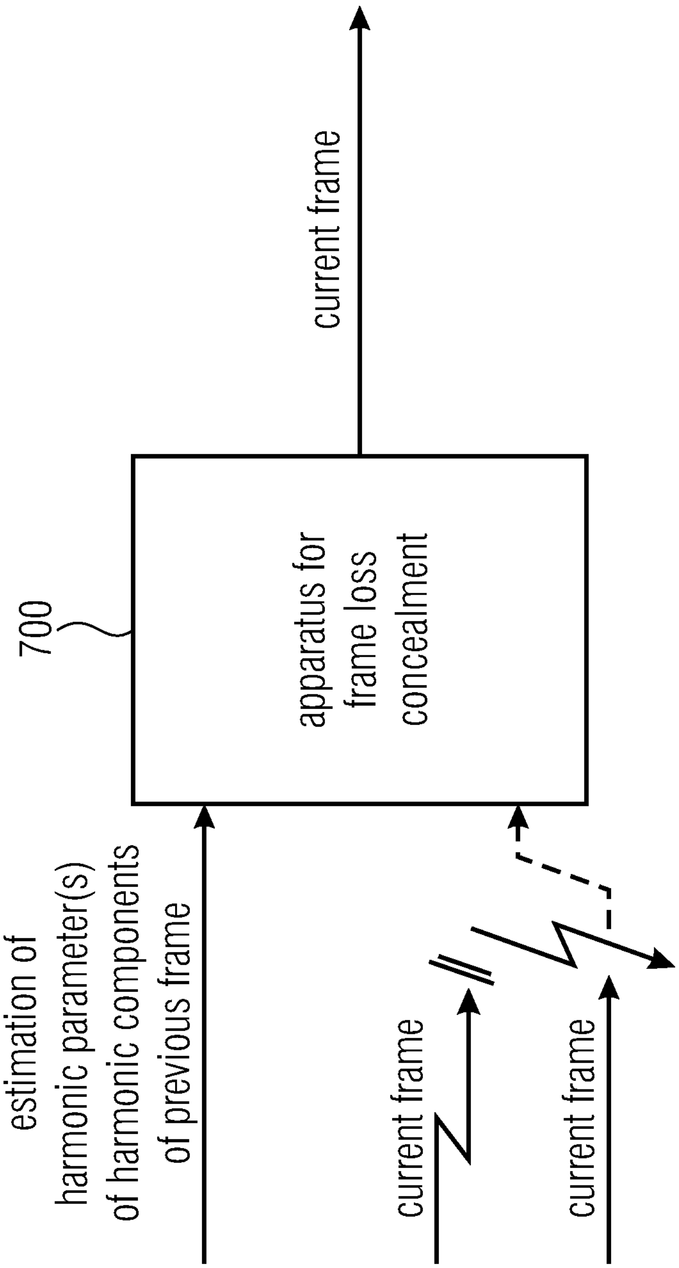
FIG. 7 illustrates an apparatus for frame loss concealment according to an embodiment.

FIG. 7 illustrates an apparatus 700 for frame loss concealment according to an embodiment.

One or more previous frames previous frame of the audio signal precedes a current frame of the audio signal. Each of the current frame and the one or more previous frames comprises one or more harmonic components of the audio signal, wherein each of the current frame and the one or more previous frames comprises a plurality of spectral coefficients in a frequency domain or in a transform domain.

The apparatus 700 is to determine an estimation of two harmonic parameters for each of the one or more harmonic components of a most previous frame of the one or more previous frames, wherein the two harmonic parameters for each of the one or more harmonic components of the most previous frame depend on a first group of three or more of the plurality of reconstructed spectral coefficients for each of the one or more previous frames of the audio signal.

If the apparatus 700 does not receive the current frame, or if the current frame is received by the apparatus 700 in a corrupted state, the apparatus 700 is to reconstruct the current frame depending on the estimation of the two harmonic parameters for each of the one or more harmonic components of the most previous frame.

The most previous frame may, e.g., be most previous with respect to the current frame.

The most previous frame may, e.g., be (referred to as) an immediately preceding frame. The immediately preceding frame may, e.g., immediately precede the current frame.

The current frame comprises one or more harmonic components of the audio signal. Each of the one or more previous frames might comprise one or more harmonic components of the audio signal. The fundamental frequency of the one or more harmonic components in the current frame and the one or more previous frames are assumed the same.

According to an embodiment, the apparatus 700 may, e.g., be configured to receive the number of the one or more harmonic components of the most previous frame. The apparatus 700 may, e.g., be to decode the encoding of the current frame depending on the number of the one or more harmonic components of the most previous frame and depending on a fundamental frequency of the one or more harmonic components of the current frame and the one or more previous frames.

In an embodiment, to reconstruct the current frame, the apparatus 700 may, e.g., be configured to determine an estimation of the two harmonic parameters for each of the one or more harmonic components of the current frame depending on the estimation of the two harmonic parameters for each of the one or more harmonic components of the most previous frame.

In an embodiment, the apparatus 700 is to apply:

$$c_h=a_h \cos(\omega_h N)+b_h \sin(\omega_h N), \text{ and}$$

wherein the apparatus 700 is to apply:

$$d_h=a_h \sin(\omega_h N)+b_h \cos(\omega_h N)$$

wherein $a_h$ is a parameter for a cosinus sub-component for an h-th harmonic component of said one or more harmonic components of the most previous frame, wherein $b_h$ is a parameter for a sinus sub-component for the h-th harmonic component of said one or more harmonic components of the most previous frame, wherein $c_h$ is a parameter for a cosinus sub-component for the h-th harmonic component of said one or more harmonic components of the current frame, wherein $d_h$ is a parameter for a sinus sub-component for the h-th harmonic component of said one or more harmonic components of the current frame, wherein N depends on a length of a transform block for transforming the time-domain audio signal into the frequency domain or into the spectral domain, and wherein $$w_h = h \cdot \frac{2\pi f_0}{f_s},$$

wherein $f_0$ is the fundamental frequency of the one or more harmonic components of the most previous frame, being a fundamental frequency of the one or more harmonic components of the current frame, wherein $f_s$ is a sampling frequency, and wherein h is an index indicating one of the one or more harmonic components of the most previous frame.

According to an embodiment, the apparatus 700 may, e.g., be configured to determine a spectral prediction of three or more of the plurality of spectral coefficients of the current frame depending on the estimation of the two harmonic parameters for each of the one or more harmonic components of the current frame.

In the following, advantageous embodiments are provided.

At first, a signal model is described.

Assuming that the harmonic part in a digital audio signal is:

$$x(n) = \sum_{h=1}^{H} A_h \cos(\omega_h(n + N/2 + 1/2) + \phi_h), \tag{1}$$

with $$w_h = h \cdot \frac{2\pi f_0}{f_s}, \tag{2}$$

where $f_0$ is the fundamental frequency of the one or more harmonic components, and H is the number of harmonic components. Without loss of generality, the expression of the phase component is deliberately divided into two parts, where the part denoted by $\omega_h \cdot (N/2+½)$ is convenient for the later on mathematical derivations when the MDCT transform is applied on x(n) with N as the MDCT frame length, and $\phi_h$ is the remainder of the phase component.

$f_s$ is, e.g., the sampling frequency.

A harmonic component is determined by three parameters: frequency, amplitude and phase. Assuming the frequency information $\omega_h$ is known, the estimation of the amplitude and phase is a non-linear regression problem. However, this can be turned into a linear regression problem by rewriting Eq. (1) as:

$$x(n) = \sum_{h=1}^{H} \left[a_h \cos(\omega_h(n + N/2 + 1/2)) + b_h \sin(\omega_h(n + N/2 + 1/2))\right], \tag{3}$$

and the unknown parameters of the harmonic are now $a_h$ and $b_h$:

$$a_h = A_h \cos(\phi_h), \tag{4a}$$

$$b_h = -A_h \sin(\phi_h). \tag{4b}$$

Transforming a block of x(n) with length 2N into the MDCT domain:

$$X(k) = \sum_{n=0}^{2N-1} f(n)x(n)\cos\left(\kappa_k\left(n + \frac{N}{2} + \frac{1}{2}\right)\right),\ 0 \le k < N - 1, \tag{5}$$

with $$\kappa_k = \frac{\pi}{N}\left(k + \frac{1}{2}\right), \tag{6}$$

where $f(n)$ is the analysis window function and $\kappa_k$ is the modulation frequency in band k.

Substituting Eq. (3) into Eq. (5), and with some mathematical derivations based on trigonometry, we have:

$$X(k) = \sum_{h=1}^{H}\left[\frac{a_h}{2}\left[F(\omega_h - \kappa_k)\cos\left(\frac{3N}{2}(\omega_h - \kappa_k)\right) + F(\omega_h - \kappa_k)\cos\left(\frac{3N}{2}(\omega_h + \kappa_k)\right)\right] + \frac{b_h}{2}\left[F(\omega_h - \kappa_k)\sin\left(\frac{3N}{2}(\omega_h - \kappa_k)\right) + F(\omega_h + \kappa_k)\sin\left(\frac{3N}{2}(\omega_h + \kappa_k)\right)\right]\right],\quad 0 \le k < N - 1, \tag{7}$$

where F( ) is a real-valued function obtained by adding a phase shift term to the Fourier transform of the window function:

$$F(\lambda) = \mathcal{DFT}\{f(n)\}e^{j\lambda(N-0.5)}. \tag{8}$$

In the following, harmonics estimation and prediction are described.

Based on the assumed signal model described above by equations (3)-(8), with an additional assumption that the frequency of the harmonic components doesn't change rapidly between adjacent frames, the proposed FDLMSP approach can be divided into three steps. E.g., to predict the mth frame, firstly the frequency information of all harmonic components in the mth frame is estimated. This frequency information will later be transmitted as part of the side information to assist the prediction at the decoder 200. Then the parameters of each harmonic component at the m−1th frame, denoted by $a_h$, $b_h$, with h=[1, . . . , H], are estimated using only the precedent frames.

In the end the mth frame is predicted based on the estimated harmonic parameters. The residual spectrum is then calculated and further processed, e.g. quantized and transmitted. The pitch information in each frame can be obtained by a pitch estimator.

At first, harmonics estimation is described in detail.

Transforms usually have limited frequency resolution, thus each harmonic component would spread over several adjacent bins around the band where its center frequency lies. For a harmonic component with frequency $\omega_h$ in the m−1th frame, it would be centered in the MDCT band with band index $\gamma_h$, where $$\gamma_h = \left\lfloor h \cdot \frac{2 \cdot f_0 \cdot N}{f_s} \right\rceil$$

and spreads over bins:

$$\Gamma_h = \gamma_h - r, \ldots, \gamma_h + r;$$

where r is the number of neighboring bins on each side.

The parameters $a_h$ and $b_h$ of that harmonic component can be estimated by solving such a linear equation system formed from Eq. (7):

$$X_{m-1}(\Gamma_h) = U_h \cdot p_h \in \mathbb{R}^{(2r+1)\times 1}, \tag{9}$$

with $$U_h = \frac{F(Y_1)}{2}\left[\cos\left(\frac{3NY_1}{2}\right), \sin\left(\frac{3NY_1}{2}\right)\right] + \frac{F(Y_2)}{2}\left[\cos\left(\frac{3NY_2}{2}\right), \sin\left(\frac{3NY_2}{2}\right)\right] \in \mathbb{R}^{(2r+1)\times 2}, \tag{10a}$$

-continued $$p_h = [a_h, b_h]^T \in \mathbb{R}^{2\times1}, \tag{10b}$$

$$\Upsilon_1 = \omega_h - \kappa_{\Gamma_h}^T \in \mathbb{R}^{(2r+1)\times1}, \tag{10c}$$

$$\Upsilon_2 = \omega_h + \kappa_{\Gamma_h}^T \in \mathbb{R}^{(2r+1)\times1}, \tag{10d}$$

$U_h$ is a real-valued matrix that is independent of the signal x(n) and can be calculated once $f_0$, N and the window function $f(n)$ are known.

Assuming that the frequency information of all the harmonic components in one frame is known, the following linear equation system by merging Eq. (9) over all harmonic components are obtained:

$$X_{m-1}(\Lambda)=U\cdot p\in \mathbb{R}^{(\gamma_H-\gamma_1+2r+1)\times1} \tag{11}$$

with $$U=[U_1,U_2, \ldots ,U_H]\in \mathbb{R}^{(\gamma_H-\gamma_1+2r+1)\times 2H} \tag{12a}$$

$$p=[p_1,p_2, \ldots ,p_H]^T\in \mathbb{R}^{2H\times1} \tag{12b}$$

$$\Lambda=[\gamma_1-r, \ldots ,\gamma_H-r]\in \mathbb{R}^{(\gamma_H-\gamma_1+2r+1)\times1} \tag{12c}$$

Both matrix U and the MDCT coefficients are real-valued, and thus there is a real-valued linear equation system. An estimate $\tilde{p}$ of the harmonic parameters can be obtained by Least Mean Squares (LMS)-solving the linear equation system with the pseudo-inverse of U:

$$\tilde{p}=U^+\cdot X_{m-1}(\Lambda). \tag{13}$$

$U^+$ is, e.g., the Moore-Penrose inverse matrix of U.

($U^+$ is, e.g., the pseudo inverse matrix of U.)

$\tilde{p}=[\tilde{p}_1, \tilde{p}_2, \ldots, \tilde{p}_H]^T\in \mathbb{R}^{2H\times1}$ is, e.g., an estimation of the harmonic parameters p.

Regarding the merging of equation (9) over all harmonic components, likewise, while equation (10b) remains unamended, equations (10a) and (10c) become:

$$U_h = \frac{F(\Upsilon_1)}{2}\left[\cos\left(\frac{3N\Upsilon_1}{2}\right), \sin\left(\frac{3N\Upsilon_1}{2}\right)\right] + \frac{F(\Upsilon_2)}{2}\left[\cos\left(\frac{3N\Upsilon_2}{2}\right), \sin\left(\frac{3N\Upsilon_2}{2}\right)\right] \in \mathbb{R}^{(\gamma_H-\gamma_1+2r+1)\times2}, \tag{11a}$$

$$\Upsilon_1 = \omega_h - \kappa_{\Lambda}^T \in \mathbb{R}^{(\gamma_H-\gamma_1+2r+1)\times1}, \tag{11b}$$

$$\Upsilon_2 = \omega_h - \kappa_{\Lambda}^T \in \mathbb{R}^{(\gamma_H-\gamma_1+2r+1)\times1}. \tag{11c}$$

As $\Lambda$ is different from $\Gamma_h$, the dimensions of $U_h$ and Y change.

The estimation of $p_h=[a_h, b_h]^T\in \mathbb{R}^{2\times1}$ of equation (10b) may, e.g., be referred to as $$\tilde{p}_h=[\tilde{a}_h,\tilde{b}_h]^T\in \mathbb{R}^{2\times1} \tag{11d}$$

In case the number of parameters to be estimated exceeds the number of MDCT bins that the harmonics span, an underdetermined system of linear equations would result. This is avoided by stacking the matrix U vertically and the vector X horizontally with the corresponding values from more previous frames. However, no extra delay is introduced, as the (most) previous frames are already in the buffer. On the contrary, with this extension, this proposed approach is applicable to extremely low frequency resolution scenarios, where the harmonic components are densely spaced. A scaling factor can be applied on the number of employed previous frames, to guarantee an overdetermined system of linear equations, which also enhances the robustness of this prediction concept against noise in the signal.

Now, prediction is described in detail.

Assume the frequencies and amplitudes of the sinusoids do not change, the mth frame in the time domain can be written as:

$$\begin{aligned} x_m(n) &= x_{m-1}(n+N) \\ &= \sum_{h=1}^{H}\Big(c_h\cos\big(\omega_h(n+N/2+1/2)\big) + d_h\sin\big(\omega_h(n+N/2+1/2)\big)\Big), \end{aligned} \tag{14}$$

$$0 \le n < N,$$

with $$c_h = a_h\cos(\omega_h N) + b_h\sin(\omega_h N), \tag{15a}$$

$$d_h = a_h\sin(\omega_h N) + b_h\cos(\omega_h N). \tag{15b}$$

With an estimate of the harmonic parameters for each of the one or more harmonic components in the m−1th frame at hand, based on equations (5)-(9), the prediction of the current MDCT frame is:

$$\tilde{X}_m(\Lambda)=U\cdot\tilde{q}, \tag{16}$$

with $$\tilde{q}=[\tilde{c}_1,\tilde{d}_1, \ldots ,\tilde{c}_h,\tilde{d}_h, \ldots ,\tilde{c}_H,\tilde{d}_H]^T. \tag{17}$$

For the bins where no prediction is done, the prediction value is set to zero.

However, due to the unstationarity of the signal, the amplitude of the harmonics may slightly vary between successive frames. A gain factor is introduced to accommodate to that amplitude change, and will be transmitted as part of the side information to the decoder 200.

The residual spectrum then is:

$$R_m(k)=X_m(k)-g\tilde{X}_m(k), 0\le k\le N. \tag{18}$$

In the following, the provided above concepts are evaluated.

Figure 4:
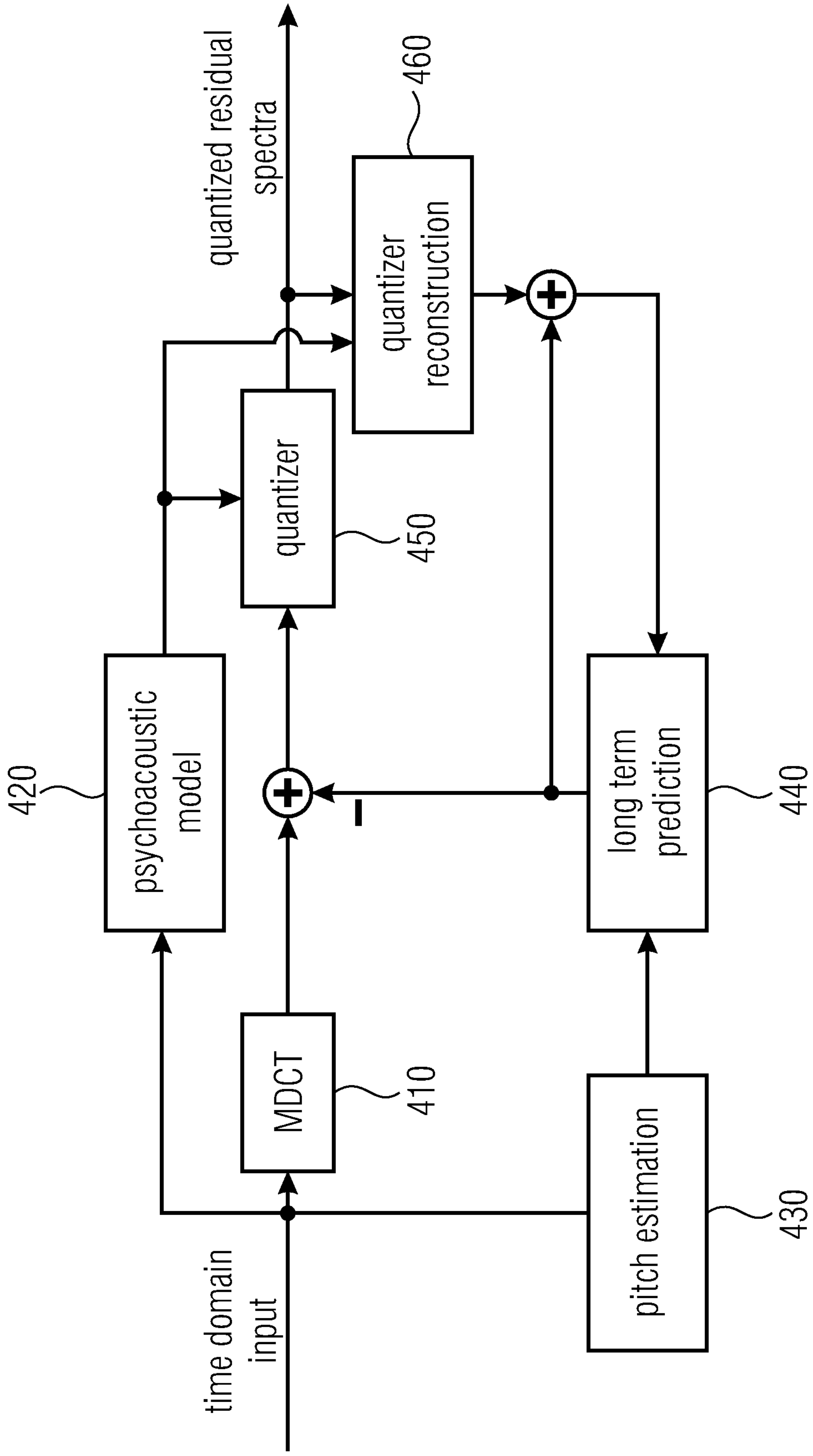
FIG. 4 illustrates a structure of a transform perceptual audio encoder with backward adaptive LTP.

To evaluate the performance of this proposed FDLMSP concept, an encoder environment in Python has been built according to FIG. 4. The provided concept is implemented following the description above, with r equals 2. For comparison, TDLTP and FDP have been reimplemented according to the reference literature [2], [5]. This aimed at using the experiments to evaluate those three prediction concepts in three different aspects: (i) the performance regarding different frequency resolutions of the MDCT coefficients, (ii) the sensitivity to inharmonicity [7] of the test materials, and (iii) the overall performance and competence compared to each other in identical coding scenarios. The inharmonicity of a tone usually implies that its higher order harmonics are no longer evenly spaced. Since the harmonicity in higher bands is perceptually less important [8], the influence of this factor by using different prediction bandwidths has been evaluated.

For an experiment, a sampling frequency of 16 kHz, and MDCT frame lengths of 64, 128, 256 and 512 have been used. The predictions are done on limited bandwidths of 1 kHz, 2 kHz, 4 kHz, and 8 kHz. A sine window as the analysis window has been chosen, as it fulfills the constraints for a perfect reconstruction [9]. This approach can also handle asymmetric windows, when switching between different frame lengths. To improve the precision of harmonics estimation, the F(ω) function is calculated on an interpolated transfer function of the analysis window. In TDLTP, for each frame a 3-tap prediction filter is calculated based on the auto-correlation concept using fully reconstructed data and the original time domain signal. When searching for the previous fully reconstructed pitch lag from the buffer data, it has also taken into account that the pitch lag might not be an integer multiple of the sampling interval. The number of temporal or spectral neighboring bins in FDP is limited to 2.

YIN algorithm [10] is used for pitch estimation. The fo search range is set to [20, . . . , 1000] Hz, and the harmonic threshold is 0.25. A complex Infinite Impulse Response (IIR) filter bank based perceptual model proposed in [11] is used to calculate the masking thresholds for quantization. A finer pitch search around the YIN estimate (±0.5 Hz with a stepsize of 0.02 Hz) and an optimal gain factor search in [0.5, . . . , 2], with stepsize of 0.01, are done jointly in each frame by minimizing the Perceptual Entropy (PE) [12] of the quantized residual, which is an approximation of the entropy of the quantized residual spectrum with consideration of the perceptual model.

The encoder has four working modes: "FDLMSP", "TDLTP", "FDP" and "Adaptive MDCT LTP (AMLTP)", respectively. In "AMLTP" mode, the encoder switches between different prediction concepts on a frame basis, with PE minimization as the criteria. For all four working modes, no prediction is done in a frame if the PE of the residual spectrum is higher than the original signal spectrum.

For each mode, the encoder is tested on six different materials: three single notes with duration of 1-2 seconds: bass note ($f_0$ around 50 Hz); harpsichord note ($f_0$ around 88 Hz), and pitchpipe note ($f_0$ around 290 Hz). Those test materials have relatively regular harmonic structure and slowly varying temporal envelope. The coder is also tested on more complicated test materials: a trumpet piece (~5 seconds long, $f_0$ varies between 300 Hz and 700 Hz), female vocal (~10 seconds long, $f_0$ varies between 200 Hz and 300 Hz} and male speech (~8 seconds long: $f_0$ varies between 100 Hz and 220 Hz). Those three test materials have widely varying envelope and fast-changing pitches along time, and less regular harmonic structure. During the experiment, it has been noticed that the bass note has a much stronger second order harmonic than the first order harmonic, leading to constantly wrong pitch estimates. Thus, the $f_0$ search range of this bass note in the YIN pitch estimator for the correct pitch estimation has been adjusted.

The average PE of the quantized residual spectrum and of the quantized original signal spectrum has been estimated. Based on the estimated PEs, the Bitrate saved (BS) [in bit per second] in transmitting the signal by applying the prediction has been calculated, without taking into account the bitrate consumption of side information. At first, the behavior of each concept has been examined, and that comparison has been limited on single notes prediction for rational inference and analysis. Then we compared the performance of four modes on identical parameter configurations.

Figure 5:
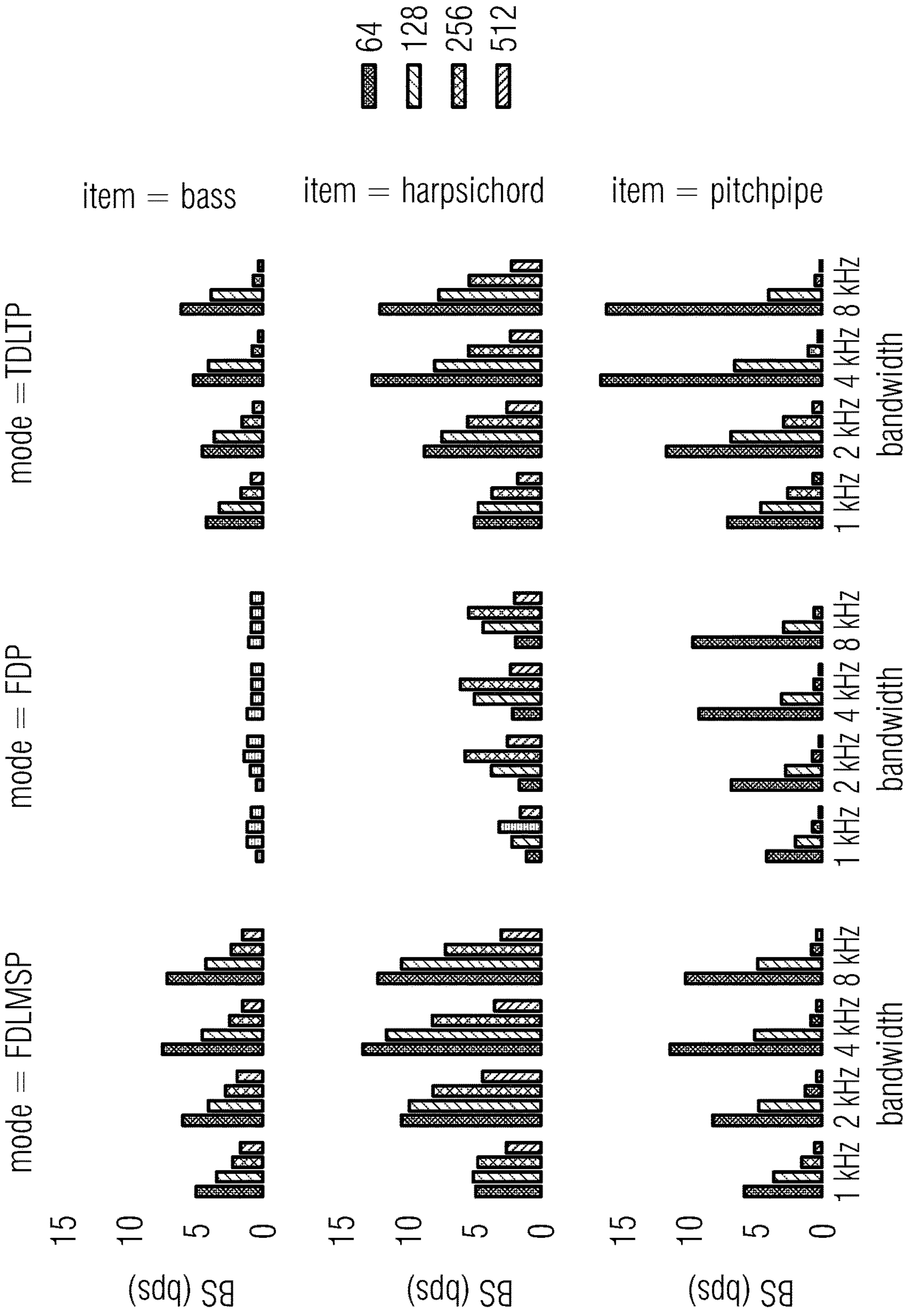
FIG. 5 illustrates bitrates saved on single note prediction using three prediction concepts, with different prediction bandwidths and MDCT lengths.

FIG. 5 illustrates bitrates saved on single note prediction using three prediction concepts, with different prediction bandwidths and MDCT lengths.

At first, The FDP prediction concept from the known technology is described in the following. The FDP prediction concept is described in more detail in [5] and in [13] (WO 2016 142357 A1, published September 2016).

Figure 8:
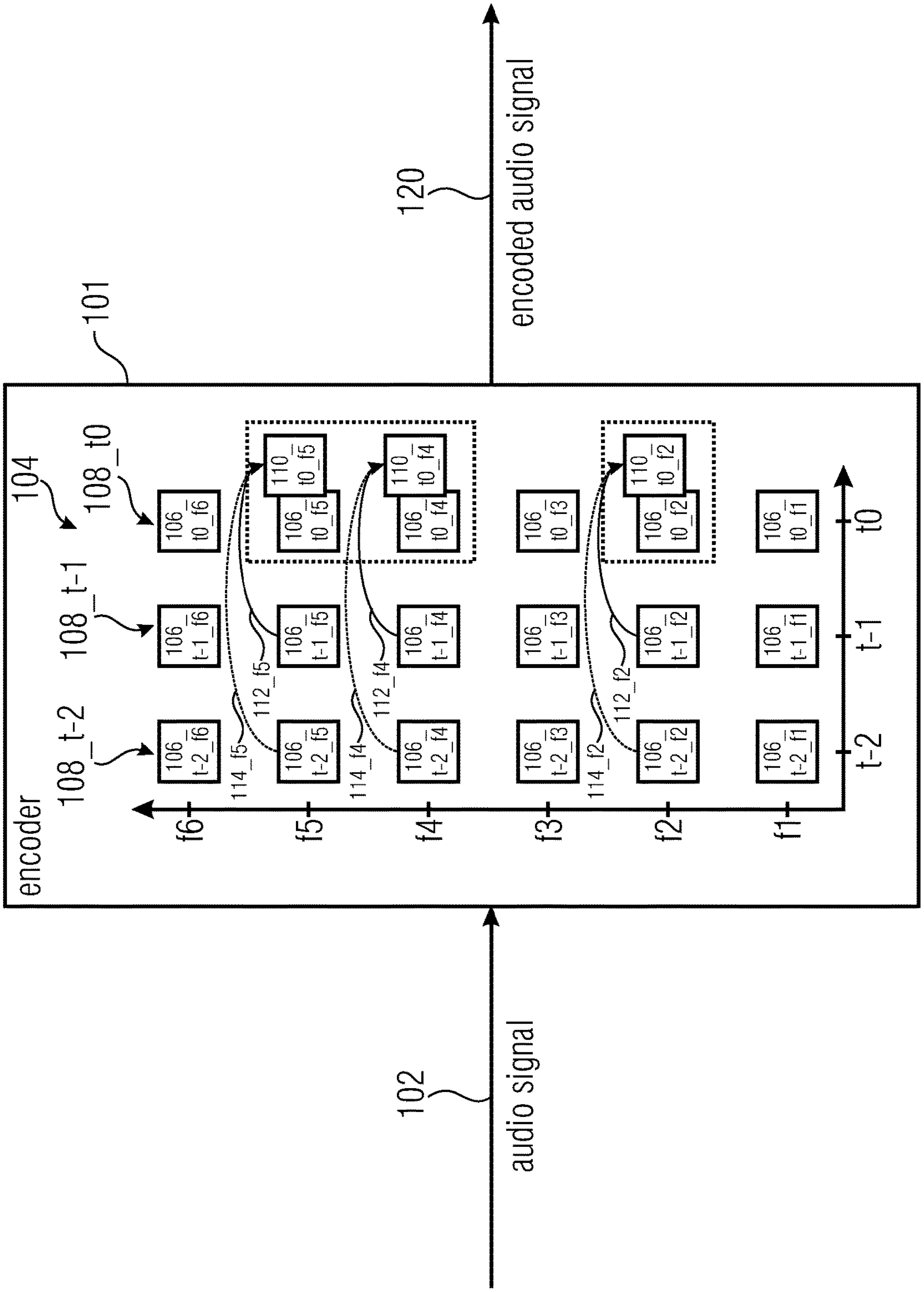
FIG. 8 illustrates a schematic block diagram of an encoder for encoding an audio signal of the FDP prediction concept according to an example.

FIG. 8 shows a schematic block diagram of an encoder 101 for encoding an audio signal 102 of the FDP prediction concept according to an example. The encoder 101 is configured to encode the audio signal 102 in a transform domain or filter-bank domain 104 (e.g., frequency domain, or spectral domain), wherein the encoder 101 is configured to determine spectral coefficients 106_*t*0_*f*1 to 106_*t*0_*f*6 of the audio signal 102 for a current frame 108_*t*0 and spectral coefficients 106_*t*−1_f1 to 106_*t*−1_f6 of the audio signal for at least one previous frame 108_*t*−1. Further, the encoder 101 is configured to selectively apply predictive encoding to a plurality of individual spectral coefficients 106_*t*0_*f*2 or groups of spectral coefficients 106_*t*0_*f*4 and 106_*t*0_*f*5, wherein the encoder 101 is configured to determine a spacing value, wherein the encoder 101 is configured to select the plurality of individual spectral coefficients 106_*t*0_*f*2 or groups of spectral coefficients 106_*t*0_*f*4 and 106_*t*0_*f*5 to which predictive encoding is applied based on the spacing value.

In other words, the encoder 101 is configured to selectively apply predictive encoding to a plurality of individual spectral coefficients 106_*t*0_*f*2 or groups of spectral coefficients 106_*t*0_*f*4 and 106_*t*0_*f*5 selected based on a single spacing value transmitted as side information.

This spacing value may correspond to a frequency (e.g. a fundamental frequency of a harmonic tone (of the audio signal 102)), which defines together with its integer multiples the centers of all groups of spectral coefficients for which prediction is applied: The first group can be centered around this frequency, the second group can be centered around this frequency multiplied by two, the third group can be centered around this frequency multiplied by three, and so on. The knowledge of these center frequencies enables the calculation of prediction coefficients for predicting corresponding sinusoidal signal components (e.g. fundamental and overtones of harmonic signals). Thus, complicated and error prone backward adaptation of prediction coefficients is no longer needed.

In examples, the encoder 101 can be configured to determine one spacing value per frame.

In examples, the plurality of individual spectral coefficients 106_*t*0_*f*2 or groups of spectral coefficients 106_*t*0_*f*4 and 106_*t*0_*f*5 can be separated by at least one spectral coefficient 106_*t*0_*f*3.

In examples, the encoder 101 can be configured to apply the predictive encoding to a plurality of individual spectral coefficients which are separated by at least one spectral coefficient, such as to two individual spectral coefficients which are separated by at least one spectral coefficient. Further, the encoder 101 can be configured to apply the predictive encoding to a plurality of groups of spectral coefficients (each of the groups comprising at least two spectral coefficients) which are separated by at least one spectral coefficient, such as to two groups of spectral coefficients which are separated by at least one spectral coefficient. Further, the encoder 101 can be configured to apply the predictive encoding to a plurality of individual spectral coefficients and/or groups of spectral coefficients which are separated by at least one spectral coefficient, such as to at least one individual spectral coefficient and at least one group of spectral coefficients which are separated by at least one spectral coefficient.

In the example shown in FIG. 8, the encoder 101 is configured to determine six spectral coefficients 106_*t*0_*f*1 to 106_*t*0_*f*6 for the current frame 108_*t*0 and six spectral coefficients 106_*t*−1_f1 to 106_*t*−1_f6 for the (most) previous frame 108_*t*−1. Thereby, the encoder 101 is configured to selectively apply predictive encoding to the individual second spectral coefficient 106_*t*0_*f*2 of the current frame and to the group of spectral coefficients consisting of the fourth and fifth spectral coefficients 106_*t*0_*f*4 and

106_*t*0_*f*5 of the current frame 108_*t*0. As can be seen, the individual second spectral coefficient 106_*t*0_*f*2 and the group of spectral coefficients consisting of the fourth and fifth spectral coefficients 106_*t*0_*f*4 and 106_*t*0_*f*5 are separated from each other by the third spectral coefficient 106_*t*0_*f*3.

Note that the term "selectively" as used herein refers to applying predictive encoding (only) to selected spectral coefficients. In other words, predictive encoding is not necessarily applied to all spectral coefficients, but rather only to selected individual spectral coefficients or groups of spectral coefficients, the selected individual spectral coefficients and/or groups of spectral coefficients which can be separated from each other by at least one spectral coefficient. In other words, predictive encoding can be disabled for at least one spectral coefficient by which the selected plurality of individual spectral coefficients or groups of spectral coefficients are separated.

In examples, the encoder 101 can be configured to selectively apply predictive encoding to a plurality of individual spectral coefficients 106_*t*0_*f*2 or groups of spectral coefficients 106_*t*0_*f*4 and 106_*t*0_*f*5 of the current frame 108_*t*0 based on at least a corresponding plurality of individual spectral coefficients 106_*t*−1_f2 or groups of spectral coefficients 106_*t*−1_f4 and 106_*t*−1_f5 of the previous frame 108_*t*−1.

For example, the encoder 101 can be configured to predictively encode the plurality of individual spectral coefficients 106_*t*0_*f*2 or the groups of spectral coefficients 106_*t*0_*f*4 and 106_*t*0_*f*5 of the current frame 108_*t*0, by coding prediction errors between a plurality of predicted individual spectral coefficients 110_*t*0_*f*2 or groups of predicted spectral coefficients 110_*t*0_*f*4 and 110_*t*0_*f*5 of the current frame 108_*t*0 and the plurality of individual spectral coefficients 106_*t*0_*f*2 or groups of spectral coefficients 106_*t*0_*f*4 and 106_*t*0_*f*5 of the current frame (or quantized versions thereof).

In FIG. 8, the encoder 101 encodes the individual spectral coefficient 106_*t*0_*f*2 and the group of spectral coefficients consisting of the spectral coefficients 106_*t*0_*f*4 and 106_*t*0_*f*5, by coding a prediction errors between the predicted individual spectral coefficient 110_*t*0_*f*2 of the current frame 108_*t*0 and the individual spectral coefficient 106_*t*0_*f*2 of the current frame 108_*t*0 and between the group of predicted spectral coefficients 110_*t*0_*f*4 and 110_*t*0_*f*5 of the current frame and the group of spectral coefficients 106_*t*0_*f*4 and 106_*t*0_*f*5 of the current frame.

In other words, the second spectral coefficient 106_*t*0_*f*2 is coded by coding the prediction error (or difference) between the predicted second spectral coefficient 110_*t*0_*f*2 and the (actual or determined) second spectral coefficient 106_*t*0_*f*2, wherein the fourth spectral coefficient 106_*t*0_*f*4 is coded by coding the prediction error (or difference) between the predicted fourth spectral coefficient 110_*t*0_*f*4 and the (actual or determined) fourth spectral coefficient 106_*t*0_*f*4, and wherein the fifth spectral coefficient 106_*t*0_*f*5 is coded by coding the prediction error (or difference) between the predicted fifth spectral coefficient 110_*t*0_*f*5 and the (actual or determined) fifth spectral coefficient 106_*t*0_*f*5.

In an example, the encoder 101 can be configured to determine the plurality of predicted individual spectral coefficients 110_*t*0_*f*2 or groups of predicted spectral coefficients 110_*t*0_*f*4 and 110_*t*0_*f*5 for the current frame 108_*t*0 by means of corresponding actual versions of the plurality of individual spectral coefficients 106_*t*−1_f2 or of the groups of spectral coefficients 106_*t*−1_f4 and 106_*t*−1_f5 of the (previous frame 108_*t*−1.

In other words, the encoder 101 may, in the above-described determination process, use directly the plurality of actual individual spectral coefficients 106_*t*−1_f2 or the groups of actual spectral coefficients 106_*t*−1_f4 and 106_*t*−1_f5 of the previous frame 108_*t*−1, where the 106_*t*−1_f2, 106_*t*−1_f4 and 106_*t*−1_f5 represent the original, not yet quantized spectral coefficients or groups of spectral coefficients, respectively, as they are obtained by the encoder 101 such that said encoder may operate in the transform domain or filter-bank domain 104.

For example, the encoder 101 can be configured to determine the second predicted spectral coefficient 110_*t*0_*f*2 of the current frame 108_*t*0 based on a corresponding not yet quantized version of the second spectral coefficient 106_*t*−1_f2 of the previous frame 10 108_*t*−1, the predicted fourth spectral coefficient 110_*t*0_*f*4 of the current frame 108_*t*0 based on a corresponding not yet quantized version of the fourth spectral coefficient 106_*t*−1_f4 of the previous frame 108_*t*−1, and the predicted fifth spectral coefficient 110_*t*0_*f*5 of the current frame 108_*t*0 based on a corresponding not yet quantized version of the fifth spectral coefficient 106_*t*−1_f5 of the previous frame.

By way of this approach, the predictive encoding and decoding scheme can exhibit a kind of harmonic shaping of the quantization noise, since a corresponding decoder, an example of which is described later with respect to FIG. 11, can only employ, in the above-noted determination step, the transmitted quantized versions of the plurality of individual spectral coefficients 106_*t*−1_f2 or of the plurality of groups of spectral coefficients 106_*t*−1_f4 and 106_*t*−1_f5 of the previous frame 108_*t*−1, for a predictive decoding.

While such harmonic noise shaping, as it is, for example, traditionally performed by long-term prediction (LTP) in the time domain, can be subjectively advantageous for predictive coding, in some cases it may be undesirable since it may lead to an unwanted, excessive amount of tonality introduced into a decoded audio signal. For this reason, an alternative predictive encoding scheme, which is fully synchronized with the corresponding decoding and, as such, only exploits any possible prediction gains but does not lead to quantization noise shaping, is described hereafter. According to this alternative encoding example, the encoder 101 can be configured to determine the plurality of predicted individual spectral coefficients 110_*t*0_*f*2 or groups of predicted spectral coefficients 110_*t*0_*f*4 and 110_*t*0_*f*5 for the current frame 108_*t*0 using corresponding quantized versions of the plurality of individual spectral coefficients 106_*t*−1_f2 or the groups of spectral coefficients 106_*t*−1_f4 and 106_*t*−1_f5 of the previous frame 108_*t*−1.

For example, the encoder 101 can be configured to determine the second predicted spectral coefficient 110_*t*0_*f*2 of the current frame 108_*t*0 based on a corresponding quantized version of the second spectral coefficient 106_*t*−1_f2 of the previous frame 108_*t*−1, the predicted fourth spectral coefficient 110_*t*0_*f*4 of the current frame 108_*t*0 based on a corresponding quantized version of the fourth spectral coefficient 106_*t*−1_f4 of the previous frame 108_*t*−1, and the predicted fifth spectral coefficient 110_*t*0_*f*5 of the current frame 108_*t*0 based on a corresponding quantized version of the fifth spectral coefficient 106_*t*−1_f5 of the previous frame.

Further, the encoder 101 can be configured to derive prediction coefficients 112_*f*2, 114_*f*2, 112_*f*4, 114_*f*4, 112_*f*5 and 114_*f*5 from the spacing value, and to calculate the plurality of predicted individual spectral coefficients **110_*t*0_*f*2 or groups of predicted spectral coefficients 110_*t*0_*f*4 and 110_*t*0_*f*5 for the current frame 108_*t*0 using corresponding quantized versions of the plurality of individual spectral coefficients 106_*t*−1_f2 and 106_*t*−2_f2 or groups of spectral coefficients 106_*t*−1_f4, 106_*t*−2_f4, 106_*t*−1_f5, and 106_*t*−2_f5 of at least two previous frames 108_*t*−1 and 108_*t*−2 and using the derived prediction coefficients 112_*f*2, 114_*f*2, 112_*f*4, 114_*f*4, 112_*f*5 and 114_*f*5**.

For example, the encoder 101 can be configured to derive prediction coefficients **112_*f*2 and 114_*f*2 for the second spectral coefficient 106_*t*0_*f*2 from the spacing value, to derive prediction coefficients 112_*f*4 and 114_*f*4 for the fourth spectral coefficient 106_*t*0_*f*4 from the spacing value, and to derive prediction coefficients 112_*f*5 and 114_*f*5 for the fifth spectral coefficient 106_*t*0_*f*5** from the spacing value.

For example, the derivation of prediction coefficients can be derived the following way: If the spacing value corresponds to a frequency f0 or a coded version thereof, the center frequency of the K-th group of spectral coefficients for which prediction is enabled is fc=K*f0. If the sampling frequency is fs and the transform hop size (shift between successive frames) is N, the ideal predictor coefficients in the K-th group assuming a sinusoidal signal with frequency fc are:

$$p1=2*\cos(N*2*pi*fc/fs) \text{ and } p2=-1.$$

If, for example, both spectral coefficients **106_*t*0_*f*4 and 106_*t*0_*f*5** are within this group, the prediction coefficients are:

$$112\_f4=112\_f5=2*\cos(N*2*pi*fc/fs) \text{ and } 114\_f4=114\_f5=-1.$$

For stability reasons, a damping factor d can be introduced leading to modified prediction coefficients:

$$112\_f4'=112\_f5'=d*2*\cos(N*2*pi*fc/fs),$$
$$114\_f4'=114\_f5'=d^2.$$

Since the spacing value is transmitted in the coded audio signal 120, the decoder can derive exactly the same prediction coefficients **212_*f*4=212_*f*5**=2*cos(N*2*pi*fc/fs) and **114_*f*4=114_*f*5**=−1. If a damping factor is used, the coefficients can be modified accordingly.

As indicated in FIG. 8, the encoder 101 can be configured to provide an encoded audio signal 120. Thereby, the encoder 101 can be configured to include in the encoded audio signal 120 quantized versions of the prediction errors for the plurality of individual spectral coefficients **106_*t*0_*f*2 or groups of spectral coefficients 106_*t*0_*f*4 and 106_*t*0_*f*5 to which predictive encoding is applied. Further, the encoder 101 can be configured to not include the prediction coefficients 112_*f*2 to 114_*f*5 in the encoded audio signal 120**.

Thus, the encoder 101 may only use the prediction coefficients **112_*f*2 to 114_*f*5 for calculating the plurality of predicted individual spectral coefficients 110_*t*0_*f*2 or groups of predicted spectral coefficients 110_*t*0_*f*4 and 110_*t*0_*f*5 and therefrom the prediction errors between the predicted individual spectral coefficient 110_*t*0_*f*2 or group of predicted spectral coefficients 110_*t*0_*f*4 and 110_*t*0_*f*5 and the individual spectral coefficient 106_*t*0_*f*2 or group of predicted spectral coefficients 110_*t*0_*f*4 and 110_*t*0_*f*5 of the current frame, but will neither provide the individual spectral coefficients 106_*t*0_*f*4 (or a quantized version thereof) or groups of spectral coefficients 106_*t*0_*f*4 and 106_*t*0_*f*5 (or quantized versions thereof) nor the prediction coefficients 112_*f*2 to 114_*f*5 in the encoded audio signal 120. Hence, a decoder, an example of which is described later with respect to FIG. 11, may derive the prediction coefficients 112_*f*2 to 114_*f*5** for calculating the plurality of predicted individual spectral coefficients or groups of predicted spectral coefficients for the current frame from the spacing value.

In other words, the encoder 101 can be configured to provide the encoded audio signal 120 including quantized versions of the prediction errors instead of quantized versions of the plurality of individual spectral coefficients **106_*t*0_*f*2 or of the groups of spectral coefficients 106_*t*0_*f*4 and 106_*t*0_*f*5 for the plurality of individual spectral coefficients 106_*t*0_*f*2 or groups of spectral coefficients 106_*t*0_*f*4 and 106_*t*0_*f*5** to which predictive encoding is applied.

Further, the encoder 101 can be configured to provide the encoded audio signal 102 including quantized versions of the spectral coefficients **106_*t*0_*f*3 by which the plurality of individual spectral coefficients 106_*t*0_*f*2 or groups of spectral coefficients 106_*t*0_*f*4 and 106_*t*0_*f*5 are separated, such that there is an alternation of spectral coefficients 106_*t*0_*f*2 or groups of spectral coefficients 106_*t*0_*f*4 and 106_*t*0_*f*5 for which quantized versions of the prediction errors are included in the encoded audio signal 120 and spectral coefficients 106_*t*0_*f*3** or groups of spectral coefficients for which quantized versions are provided without using predictive encoding.

In examples, the encoder 101 can be further configured to entropy encode the quantized versions of the prediction errors and the quantized versions of the spectral coefficients **106_*t*0_*f*3 by which the plurality of individual spectral coefficients 106_*t*0_*f*2 or groups of spectral coefficients 106_*t*0_*f*4 and 106_*t*0_*f*5 are separated, and to include the entropy encoded versions in the encoded audio signal 120** (instead of the non-entropy encoded versions thereof).

In examples, the encoder 101 can be configured to select groups 116_1 to 116_6 of spectral coefficients (or individual spectral coefficients) spectrally arranged according to a harmonic grid defined by the spacing value for a predictive encoding. Thereby, the harmonic grid defined by the spacing value describes the periodic spectral distribution (equidistant spacing) of harmonics in the audio signal 102. In other words, the harmonic grid defined by the spacing value can be a sequence of spacing values describing the equidistant spacing of harmonics of the audio signal.

Further, the encoder 101 can be configured to select spectral coefficients (e.g. only those spectral coefficients), spectral indices of which are equal to or lie within a range (e.g. predetermined or variable) around a plurality of spectral indices derived on the basis of the spacing value, for a predictive encoding.

From the spacing value the indices (or numbers) of the spectral coefficients which represent the harmonics of the audio signal 102 can be derived. For example, assuming that a fourth spectral coefficient **106_*t*0_*f*4 represents the instantaneous fundamental frequency of the audio signal 102 and assuming that the spacing value is five, the spectral coefficient having the index nine can be derived on the basis of the spacing value. The so derived spectral coefficient having the index nine, i.e. the ninth spectral coefficient 106_*t*0_*f*9, represents the second harmonic. Similarly, the spectral coefficients having the indices 14, 19, 24 and 29 can be derived, representing the third to sixth harmonics 124_3 to 124_6**. However, not only spectral coefficients having the indices which are equal to the plurality of spectral indices derived on the basis of the spacing value may be predictively encoded, but also spectral coefficients having indices within a given range around the plurality of spectral indices derived on the basis of the spacing value.

Further, the encoder 101 can be configured to select the groups 116_1 to 116_6 of spectral coefficients (or plurality of individual spectral coefficients) to which predictive encoding is applied such that there is a periodic alternation, periodic with a tolerance of +/−1 spectral coefficient, between groups 116_1 to 116_6 of spectral coefficients (or the plurality of individual spectral coefficients) to which predictive encoding is applied and the spectral coefficients by which groups of spectral coefficients (or the plurality of individual spectral coefficients) to which predictive encoding is applied are separated. The tolerance of +/−1 spectral coefficient may be used when a distance between two harmonics of the audio signal 102 is not equal to an integer spacing value (integer with respect to indices or numbers of spectral coefficients) but rather to a fraction or multiple thereof.

In other words, the audio signal 102 can comprise at least two harmonic signal components 124_1 to 124_6, wherein the encoder 101 can be configured to selectively apply predictive encoding to those plurality of groups 116_1 to 116_6 of spectral coefficients (or individual spectral coefficients) which represent the at least two harmonic signal components 124_1 to 124_6 or spectral environments around the at least two harmonic signal components 124_1 to 124_6 of the audio signal 102. The spectral environments around the at least two harmonic signal components 124_1 to 124_6 can be, for example, +/−1, 2, 3, 4 or 5 spectral components.

Thereby, the encoder 101 can be configured to not apply predictive encoding to those groups 118_1 to 118_5 of spectral coefficients (or plurality of individual spectral coefficients) which do not represent the at least two harmonic signal components 124_1 to 124_6 or spectral environments of the at least two harmonic signal components 124_1 to 124_6 of the audio signal 102. In other words, the encoder 101 can be configured to not apply predictive encoding to those plurality of groups 118_1 to 118_5 of spectral coefficients (or individual spectral coefficients) which belong to a non-tonal background noise between signal harmonics 124_1 to 124_6.

Further, the encoder 101 can be configured to determine a harmonic spacing value indicating a spectral spacing between the at least two harmonic signal components 124_1 to 124_6 of the audio signal 102, the harmonic spacing value indicating those plurality of individual spectral coefficients or groups of spectral coefficients which represent the at least two harmonic signal components 124_1 to 124_6 of the audio signal 102.

Furthermore, the encoder 101 can be configured to provide the encoded audio signal 120 such that the encoded audio signal 120 includes the spacing value (e.g., one spacing value per frame) or (alternatively) a parameter from which the spacing value can be directly derived.

Examples address the abovementioned two issues of the FDP method by introducing a harmonic spacing value into the FDP process, signaled from the encoder (transmitter) 101 to a respective decoder (receiver) such that both can operate in a fully synchronized fashion. Said harmonic spacing value may serve as an indicator of an instantaneous fundamental frequency (or pitch) of one or more spectra associated with a frame to be coded and identifies which spectral bins (spectral coefficients) shall be predicted. More specifically, only those spectral coefficients around harmonic signal components located (in terms of their indexing) at integer multiples of the fundamental pitch (as defined by the harmonic spacing value) shall be subjected to the prediction.

Figure 9:
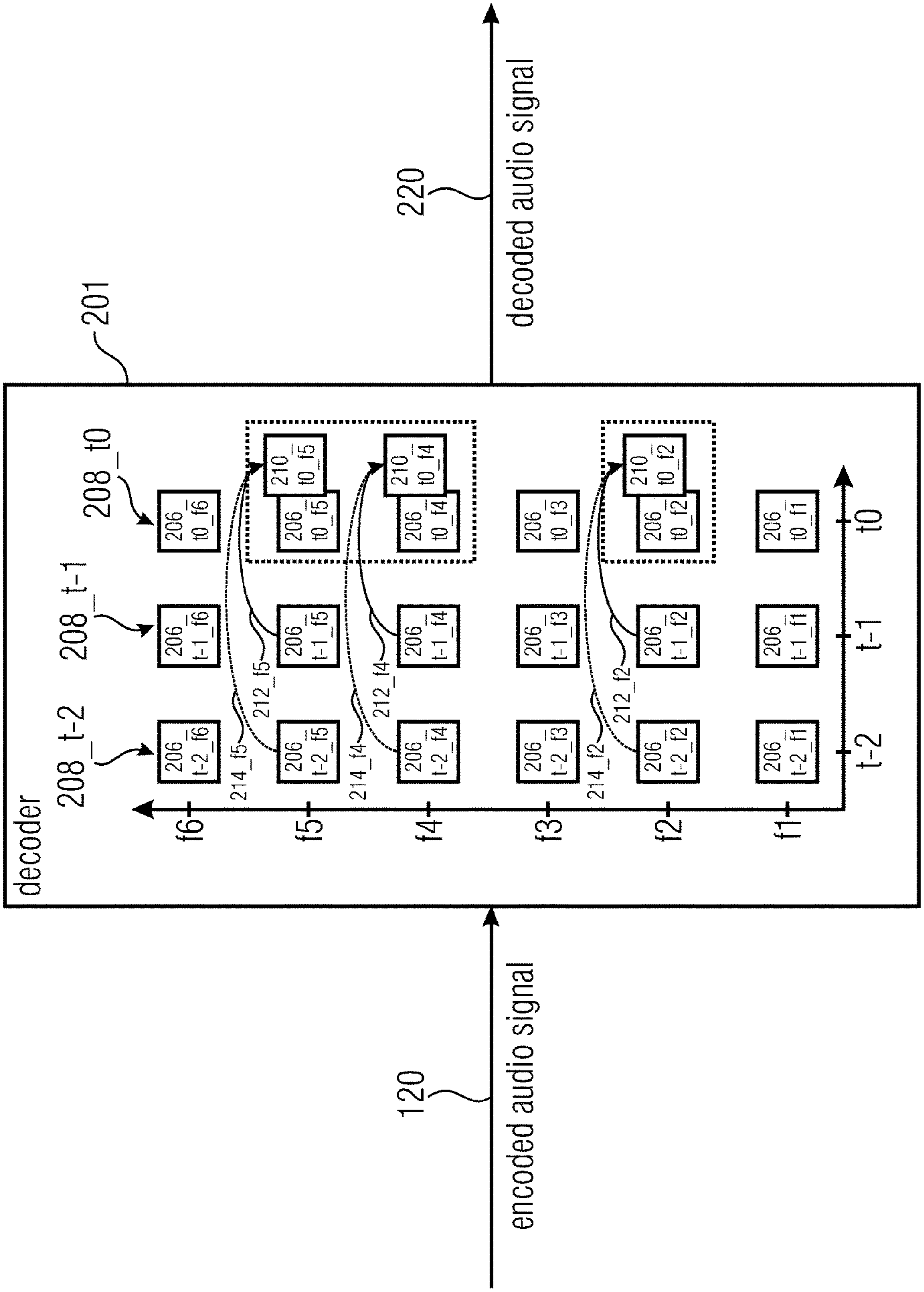
FIG. 9 shows a schematic block diagram of a decoder 201 for decoding an encoded signal 120 of the FDP prediction concept according to an example.

FIG. 9 shows a schematic block diagram of a decoder 201 for decoding an encoded signal 120 of the FDP prediction concept according to an example. The decoder 201 is configured to decode the encoded audio signal 120 in a transform domain or filter-bank domain 204, wherein the decoder 201 is configured to parse the encoded audio signal 120 to obtain encoded spectral coefficients 206_t0_f1 to 206_t0_f6 of the audio signal for a current frame 208_t0 and encoded spectral coefficients 206_t−1_f0 to 206_t−1_f6 for at least one previous frame 208_t−1, and wherein the decoder 201 is configured to selectively apply predictive decoding to a plurality of individual encoded spectral coefficients or groups of encoded spectral coefficients which are separated by at least one encoded spectral coefficient.

In examples, the decoder 201 can be configured to apply the predictive decoding to a plurality of individual encoded spectral coefficients which are separated by at least one encoded spectral coefficient, such as to two individual encoded spectral coefficients which are separated by at least one encoded spectral coefficient. Further, the decoder 201 can be configured to apply the predictive decoding to a plurality of groups of encoded spectral coefficients (each of the groups comprising at least two encoded spectral coefficients) which are separated by at least one encoded spectral coefficients, such as to two groups of encoded spectral coefficients which are separated by at least one encoded spectral coefficient. Further, the decoder 201 can be configured to apply the predictive decoding to a plurality of individual encoded spectral coefficients and/or groups of encoded spectral coefficients which are separated by at least one encoded spectral coefficient, such as to at least one individual encoded spectral coefficient and at least one group of encoded spectral coefficients which are separated by at least one encoded spectral coefficient.

In the example shown in FIG. 9, the decoder 201 is configured to determine six encoded spectral coefficients 206_t0_f1 to 206_t0_f6 for the current frame 208_t0 and six encoded spectral coefficients 206_t−1_f1 to 206_t−1_f6 for the previous frame 208_t−1. Thereby, the decoder 201 is configured to selectively apply predictive decoding to the individual second encoded spectral coefficient 206_t0_f2 of the current frame and to the group of encoded spectral coefficients consisting of the fourth and fifth encoded spectral coefficients 206_t0_f4 and 206_t0_f5 of the current frame 208_t0. As can be seen, the individual second encoded spectral coefficient 206_t0_f2 and the group of encoded spectral coefficients consisting of the fourth and fifth encoded spectral coefficients 206_t0_f4 and 206_t0_f5 are separated from each other by the third encoded spectral coefficient 206_t0_f3.

Note that the term "selectively" as used herein refers to applying predictive decoding (only) to selected encoded spectral coefficients. In other words, predictive decoding is not applied to all encoded spectral coefficients, but rather only to selected individual encoded spectral coefficients or groups of encoded spectral coefficients, the selected individual encoded spectral coefficients and/or groups of encoded spectral coefficients being separated from each other by at least one encoded spectral coefficient. In other words, predictive decoding is not applied to the at least one encoded spectral coefficient by which the selected plurality of individual encoded spectral coefficients or groups of encoded spectral coefficients are separated.

In examples the decoder 201 can be configured to not apply the predictive decoding to the at least one encoded spectral coefficient 206_*t*0_*f*3 by which the individual encoded spectral coefficients 206_*t*0_*f*2 or the group of spectral coefficients 206_*t*0_*f*4 and 206_*t*0_*f*5 are separated.

The decoder 201 can be configured to entropy decode the encoded spectral coefficients, to obtain quantized prediction errors for the spectral coefficients 206_*t*0_*f*2, 2016_*t*0_*f*4 and 206_*t*0_*f*5 to which predictive decoding is to be applied and quantized spectral coefficients 206_*t*0_*f*3 for the at least one spectral coefficient to which predictive decoding is not to be applied. Thereby, the decoder 201 can be configured to apply the quantized prediction errors to a plurality of predicted individual spectral coefficients 210_*t*0_*f*2 or groups of predicted spectral coefficients 210_*t*0_*f*4 and 210_*t*0_*f*5, to obtain, for the current frame 208_*t*0, decoded spectral coefficients associated with the encoded spectral coefficients 206_*t*0_*f*2, 206_*t*0_*f*4 and 206_*t*0_*f*5 to which predictive decoding is applied.

For example, the decoder 201 can be configured to obtain a second quantized prediction error for a second quantized spectral coefficient 206_*t*0_*f*2 and to apply the second quantized prediction error to the predicted second spectral coefficient 210_*t*0_*f*2, to obtain a second decoded spectral coefficient associated with the second encoded spectral coefficient 206_*t*0_*f*2, wherein the decoder 201 can be configured to obtain a fourth quantized prediction error for a fourth quantized spectral coefficient 206_*t*0_*f*4 and to apply the fourth quantized prediction error to the predicted fourth spectral coefficient 210_*t*0_*f*4, to obtain a fourth decoded spectral coefficient associated with the fourth encoded spectral coefficient 206_*t*0_*f*4, and wherein the decoder 201 can be configured to obtain a fifth quantized prediction error for a fifth quantized spectral coefficient 206_*t*0_*f*5 and to apply the fifth quantized prediction error to the predicted fifth spectral coefficient 210_*t*0_*f*5, to obtain a fifth decoded spectral coefficient associated with the fifth encoded spectral coefficient 206_*t*0_*f*5.

Further, the decoder 201 can be configured to determine the plurality of predicted individual spectral coefficients 210_*t*0_*f*2 or groups of predicted spectral coefficients 210_*t*0_*f*4 and 210_*t*0_*f*5 for the current frame 208_*t*0 based on a corresponding plurality of the individual encoded spectral coefficients 206_*t*−1_f2 (e.g., using a plurality of previously decoded spectral coefficients associated with the plurality of the individual encoded spectral coefficients 206_*t*−1_f2) or groups of encoded spectral coefficients 206_*t*−1_f4 and 206_*t*−1_f5 (e.g., using groups of previously decoded spectral coefficients associated with the groups of encoded spectral coefficients 206_*t*−1_f4 and 206_*t*−1_f5) of the previous frame 208_*t*−1.

For example, the decoder 201 can be configured to determine the second predicted spectral coefficient 210_*t*0_*f*2 of the current frame 208_*t*0 using a previously decoded (quantized) second spectral coefficient associated with the second encoded spectral coefficient 206_*t*−1_f2 of the previous frame 208_*t*−1, the fourth predicted spectral coefficient 210_*t*0_*f*4 of the current frame 2080*t* using a previously decoded (quantized) fourth spectral coefficient associated with the fourth encoded spectral coefficient 206_*t*−1_f4 of the previous frame 208_*t*−1, and the fifth predicted spectral coefficient 210_*t*0_*f*5 of the current frame 208_*t*0 using a previously decoded (quantized) fifth spectral coefficient associated with the fifth encoded spectral coefficient 206_*t*−1_f5 of the previous frame 208_*t*−1.

Furthermore, the decoder 201 can be configured to derive prediction coefficients from the spacing value, and wherein the decoder 201 can be configured to calculate the plurality of predicted individual spectral coefficients 210_*t*0_*f*2 or groups of predicted spectral coefficients 210_*t*0_*f*4 and 210_*t*0_*f*5 for the current frame 208_*t*0 using a corresponding plurality of previously decoded individual spectral coefficients or groups of previously decoded spectral coefficients of at least two previous frames 208_*t*−1 and 208_*t*−2 and using the derived prediction coefficients.

For example, the decoder 201 can be configured to derive prediction coefficients 212_*f*2 and 214_*f*2 for the second encoded spectral coefficient 206_*t*0_*f*2 from the spacing value, to derive prediction coefficients 212_*f*4 and 214_*f*4 for the fourth encoded spectral coefficient 206_*t*0_*f*4 from the spacing value, and to derive prediction coefficients 212_*f*5 and 214_*f*5 for the fifth encoded spectral coefficient 206_*t*0_*f*5 from the spacing value.

Note that the decoder 201 can be configured to decode the encoded audio signal 120 in order to obtain quantized prediction errors instead of a plurality of individual quantized spectral coefficients or groups of quantized spectral coefficients for the plurality of individual encoded spectral coefficients or groups of encoded spectral coefficients to which predictive decoding is applied.

Further, the decoder 201 can be configured to decode the encoded audio signal 120 in order to obtain quantized spectral coefficients by which the plurality of individual spectral coefficients or groups of spectral coefficients are separated, such that there is an alternation of encoded spectral coefficients 206_*t*0_*f*2 or groups of encoded spectral coefficients 206_*t*0_*f*4 and 206_*t*0_*f*5 for which quantized prediction errors are obtained and encoded spectral coefficients 206_*t*0_*f*3 or groups of encoded spectral coefficients for which quantized spectral coefficients are obtained.

The decoder 201 can be configured to provide a decoded audio signal 220 using the decoded spectral coefficients associated with the encoded spectral coefficients 206_*t*0_*f*2, 206_*t*0_*f*4 and 206_*t*0_*f*5 to which predictive decoding is applied, and using entropy decoded spectral coefficients associated with the encoded spectral coefficients 206_*t*0_*f*1, 206_*t*0_*f*3 and 206_*t*0_*f*6 to which predictive decoding is not applied.

In examples, the decoder 201 can be configured to obtain a spacing value, wherein the decoder 201 can be configured to select the plurality of individual encoded spectral coefficients 206_*t*0_*f*2 or groups of encoded spectral coefficients 206_*t*0_*f*4 and 206_*t*0_*f*5 to which predictive decoding is applied based on the spacing value.

As already mentioned above with respect to the description of the corresponding encoder 101, the spacing value can be, for example, a spacing (or distance) between two characteristic frequencies of the audio signal. Further, the spacing value can be a an integer number of spectral coefficients (or indices of spectral coefficients) approximating the spacing between the two characteristic frequencies of the audio signal. Naturally, the spacing value can also be a fraction or multiple of the integer number of spectral coefficients describing the spacing between the two characteristic frequencies of the audio signal.

The decoder 201 can be configured to select individual spectral coefficients or groups of spectral coefficients spectrally arranged according to a harmonic grid defined by the spacing value for a predictive decoding. The harmonic grid defined by the spacing value may describe the periodic spectral distribution (equidistant spacing) of harmonics in the audio signal 102. In other words, the harmonic grid defined by the spacing value can be a sequence of spacing values describing the equidistant spacing of harmonics of the audio signal 102.

Furthermore, the decoder 201 can be configured to select spectral coefficients (e.g. only those spectral coefficients), spectral indices of which are equal to or lie within a range (e.g. predetermined or variable range) around a plurality of spectral indices derived on the basis of the spacing value, for a predictive decoding. Thereby, the decoder 201 can be configured to set a width of the range in dependence on the spacing value.

In examples, the encoded audio signal can comprise the spacing value or an encoded version thereof (e.g., a parameter from which the spacing value can be directly derived), wherein the decoder 201 can be configured to extract the spacing value or the encoded version thereof from the encoded audio signal to obtain the spacing value.

Alternatively, the decoder 201 can be configured to determine the spacing value by itself, i.e. the encoded audio signal does not include the spacing value. In that case, the decoder 201 can be configured to determine an instantaneous fundamental frequency (of the encoded audio signal 120 representing the audio signal 102) and to derive the spacing value from the instantaneous fundamental frequency or a fraction or a multiple thereof.

In examples, the decoder 201 can be configured to select the plurality of individual spectral coefficients or groups of spectral coefficients to which predictive decoding is applied such that there is a periodic alternation, periodic with a tolerance of +/−1 spectral coefficient, between the plurality of individual spectral coefficients or groups of spectral coefficients to which predictive decoding is applied and the spectral coefficients by which the plurality of individual spectral coefficients or groups of spectral coefficients to which predictive decoding is applied are separated.

In examples, the audio signal 102 represented by the encoded audio signal 120 comprises at least two harmonic signal components, wherein the decoder 201 is configured to selectively apply predictive decoding to those plurality of individual encoded spectral coefficients 206_*t*0_*f*2 or groups of encoded spectral coefficients 206_*t*0_*f*4 and 206_*t*0_*f*5 which represent the at least two harmonic signal components or spectral environments around the at least two harmonic signal components of the audio signal 102. The spectral environments around the at least two harmonic signal components can be, for example, +/−1, 2, 3, 4 or 5 spectral components.

Thereby, the decoder 201 can be configured to identify the at least two harmonic signal components, and to selectively apply predictive decoding to those plurality of individual encoded spectral coefficients 206_*t*0_*f*2 or groups of encoded spectral coefficients 206_*t*0_*f*4 and 206_*t*0_*f*5 which are associated with the identified harmonic signal components, e.g., which represent the identified harmonic signal components or which surround the identified harmonic signal components).

Alternatively, the encoded audio signal 120 may comprise an information (e.g., the spacing value) identifying the at least two harmonic signal components. In that case, the decoder 201 can be configured to selectively apply predictive decoding to those plurality of individual encoded spectral coefficients 206_*t*0_*f*2 or groups of encoded spectral coefficients 206_*t*0_*f*4 and 206_*t*0_*f*5 which are associated with the identified harmonic signal components, e.g., which represent the identified harmonic signal components or which surround the identified harmonic signal components).

In both of the aforementioned alternatives, the decoder 201 can be configured to not apply predictive decoding to those plurality of individual encoded spectral coefficients 206_*t*0_*f*3, 206_*t*0_*f*1 and 206_*t*0_*f*6 or groups of encoded spectral coefficients which do not represent the at least two harmonic signal components or spectral environments of the at least two harmonic signal components of the audio signal 102.

In other words, the decoder 201 can be configured to not apply predictive decoding to those plurality of individual encoded spectral coefficients 206_*t*0_*f*3, 206_*t*0_1, 206_*t*0_*f*6 or groups of encoded spectral coefficients which belong to a non-tonal background noise between signal harmonics of the audio signal 102.

An idea of particular embodiments is now two provide an encoder and a decoder having different operation modes.

According to an embodiment, the encoder 100 may, e.g., be operable in a first mode and may, e.g., be operable in at least one of a second mode and a third mode and a fourth mode.

If the encoder 100 is in the first mode, the encoder 100 may, e.g., be configured to encode the current frame by determining the estimation of the two harmonic parameters for each of the one or more harmonic components of the most previous frame using the first group of three or more of the plurality of spectral coefficients of each of the one or more previous frames of the audio signal.

If the encoder 100 is in the second mode, the encoder 100 may, e.g., be configured to encode the audio signal in the transform domain or in the filter-bank domain, and the encoder may, e.g., be configured to determine the plurality of spectral coefficients 106_*t*0_*f*1:106_*t*0_*f*6; 106_*t*−1_f1:106_*t*−1_f6 of the audio signal 102 for the current frame 108_*t*0 and for at least the previous frame 108_*t*−1, wherein the encoder 100 may, e.g., be configured to selectively apply predictive encoding to a plurality of individual spectral coefficients 106_*t*0_*f*2 or groups of spectral coefficients 106_*t*0_*f*4,106_*t*0_*f*5, the encoder 100 may, e.g., be configured to determine a spacing value, the encoder 100 may, e.g., be configured to select the plurality of individual spectral coefficients 106_*t*0_*f*2 or groups of spectral coefficients 106_*t*0_*f*4,106_*t*0_*f*5 to which predictive encoding may, e.g., be applied based on the spacing value.

In an embodiment, in each of the first mode and the second mode and the third mode and the fourth mode, the encoder 100 may, e.g., be configured to refine the fundamentally frequency to obtain a refined fundamental frequency and is to adapt the gain factor to obtain an adapted gain factor on a frame basis depending on a minimization criteria. Moreover, the encoder 100 may, e.g., be configured to encode the refined fundamental frequency and the adapted gain factor instead of the original fundamental frequency and gain factor.

In an embodiment, the encoder 100 may, e.g., be configured to set itself into the first mode or into at least one of the second mode and the third mode and the fourth mode, depending on the current frame of the audio signal. The encoder 100 may, e.g., be configured to encode, whether the current frame has been encoded in the first mode or in the second mode or in the third mode or in the fourth mode.

With respect to the decoder, according to an embodiment, the decoder 200 may, e.g., be operable in a first mode and may, e.g., be operable in at least one of a second mode and a third mode and a fourth mode.

If the decoder 200 is in the first mode, the decoder 200 may, e.g., be configured to determine the estimation of the two harmonic parameters for each of the one or more harmonic components of the most previous frame, wherein the two harmonic parameters for each of the one or more harmonic components of the most previous frame depend on a first group of three or more of the plurality of reconstructed spectral coefficients for each of the one or more previous frames of the audio signal, and the decoder 200 may, e.g., be configured to decode the encoding of the current frame depending on the estimation of the two harmonic parameters for each of the one or more harmonic components of the most previous frame.

If the decoder 200 is in the second mode, the decoder 200 may, e.g., be configured to parse an encoding of the audio signal 120 to obtain encoded spectral coefficients 206_*t*0_*f*1: 206_*t*0_*f*6; 206_*t*−1_f1:206_*t*−1_f6 of the audio signal 120 for the current frame 208_*t*0 and for at least the previous frame 208_*t*−1, and the decoder 200 may, e.g., be configured to selectively apply predictive decoding to a plurality of individual encoded spectral coefficients 206_*t*0_*f*2 or groups of encoded spectral coefficients 206_*t*0_*f*4,206_*t*0_*f*5, wherein the decoder 200 may, e.g., be configured to obtain a spacing value, wherein the decoder 200 may, e.g., be configured to select the plurality of individual encoded spectral coefficients 206_*t*0_*f*2 or groups of encoded spectral coefficients 206_*t*0_*f*4,206_*t*0_*f*5 to which predictive decoding may, e.g., be applied based on the spacing value.

If the decoder 200 is in the third mode, the decoder 200 may, e.g., be configured to decode the audio signal by employing Time Domain Long-term Prediction.

If the decoder 200 is in the fourth mode, the decoder 200 may, e.g., be to decode the audio signal by employing Adaptive Modified Discrete Cosine Transform Long-Term Prediction, wherein, if the decoder 200 employs Adaptive Modified Discrete Cosine Transform Long-Term Prediction, the decoder 200 may, e.g., be configured to select either Time Domain Long-term Prediction or Frequency Domain Prediction or Frequency Domain Least Mean Square Prediction as a prediction method on a frame basis depending on a minimization criteria.

According to an embodiment, in each of the first mode and the second mode and the third mode and the fourth mode, the decoder 200 may, e.g., be configured to decode the audio signal depending on a refined fundamental frequency and depending on an adapted gain factor, which have been determined on a frame basis.

In an embodiment, the decoder 200 may, e.g., be to receive and decode an encoding comprising an indication on whether the current frame has been encoded in the first mode or in the second mode or in the third mode or in the fourth mode. The decoder 200 may, e.g., be to set itself into the first mode or into the second mode or into the third mode or into the fourth mode depending on the indication.

In FIG. 5 it can be seen that the BS of all three concepts drops greatly for pipe note when the frame length increases, as the redundancy in the original signal has been greatly removed by the transform itself. FDP's performance degrades greatly for the low-pitched bass note, because of highly overlapping harmonics on the MDCT coefficients. TDLTP's performance is overall good. But it degrades when frame length is large, where a larger delay in finding the matching previous pitch period is needed. FDLMSP offers relatively good and stable performance regarding different notes and different frame lengths. FIG. 5 also shows that the BS drops when the prediction bandwidth increases to 8 kHz, which results from the inharmonicity of tones in higher frequency bands. Since the inharmonicity depends on the spectral characteristics of each individual sound material, a pre-calculation and comparison on bitrate consumption can be done band-wise to obtain higher coding efficiency. A prediction decision can then be made and signaled in each frame as a side information.

Figure 6:
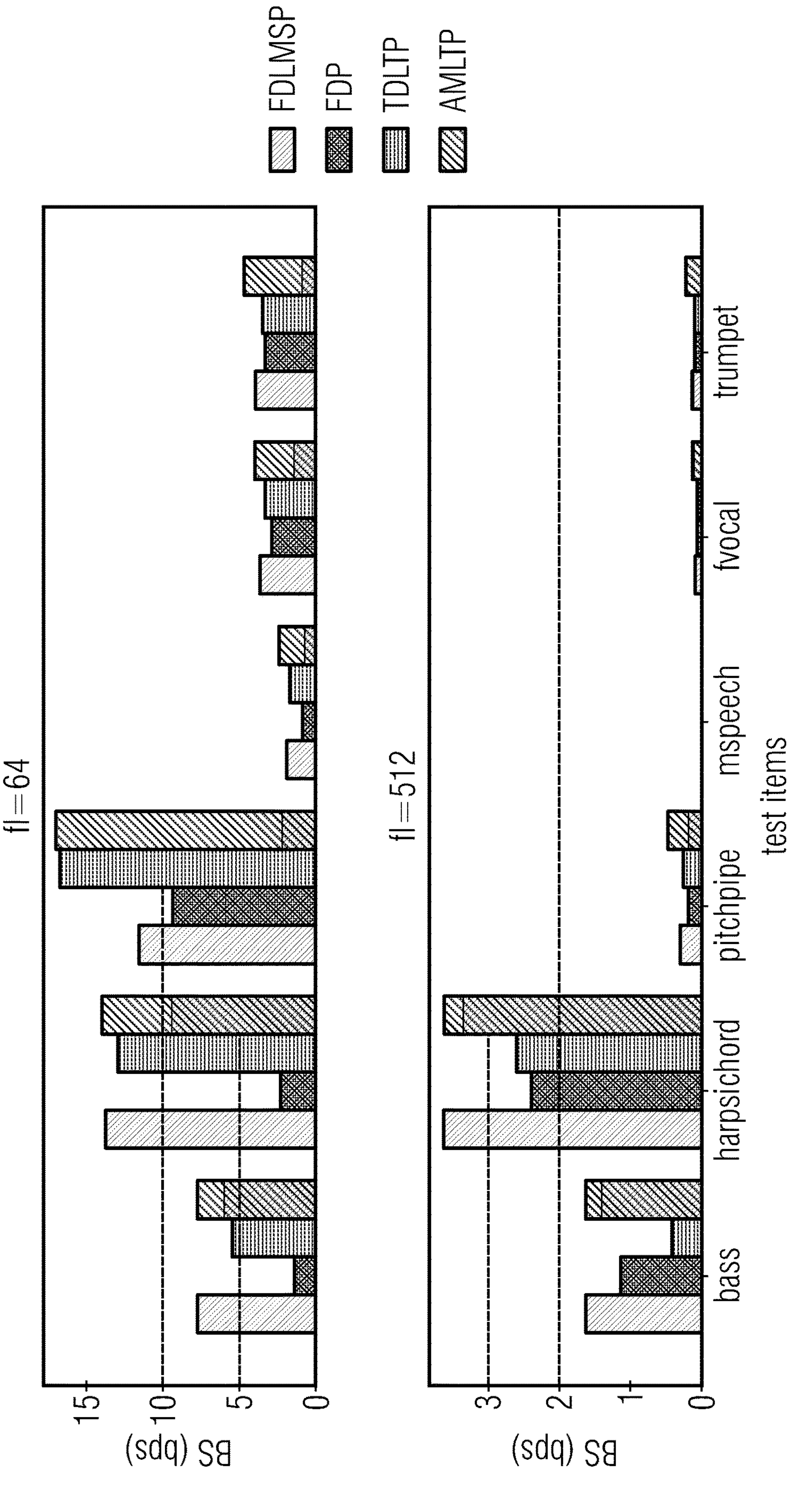
FIG. 6 illustrates bitrates saved in four different working modes, on six different items with bandwidth limited to 4 kHz, and MDCT framelength 64 and 512.

FIG. 6 illustrates bitrates saved in four different working modes, on six different items with bandwidth limited to 4 kHz, and MDCT framelength 64 and 512.

As is shown in FIG. 6, FDLMSP outperforms TDLTP and FDP in many scenarios, and offers in general good performance. AMLTP performs the best, and selects in most cases either FDLMSP or TDLTP, indicating that FDLMSP can be combined with TDLTP to greatly enhance the BS.

A novel approach for LTP in the MDCT domain has been provided. The novel approach models each MDCT frame as a supposition of harmonic components, and estimates the parameters of all the harmonic components from the previous frames using the LMS concept. The prediction is then done based on the estimated harmonic parameters. This approach offers competitive performance compared to its peer concepts and can also be used jointly to enhance the audio coding efficiency.

The above concepts may, e.g., be employed to analyse the influence of the pitch information precision on prediction, e.g. by using different pitch estimation algorithms or by applying different quantization stepsizes. The above concepts may also be employed to determine or to refine a pitch information of the audio signal on a frame basis using a minimization criteria. The impact of inharmonicity and other complicated signal characteristics on the prediction may, e.g., be taken into account. The above concepts may, for example, be employed for error concealment.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Jürgen Herre and Sascha Dick, "Psychoacoustic models for perceptual audio coding a tutorial review," Applied Sciences, vol. 9, pp. 2854, ITT 2019.

[2] Juha Ojanperã, Mauri Vããnãnen, and Lin Yin, "Long Term Predictor for Transform Domain Perceptual Audio Coding," in Audio Engineering Society Convention 107, September 1999.

[3] Hendrik Fuchs, "Improving mpeg audio coding by backward adaptive linear stereo prediction," in Audio Engineering Society Convention 99, October 1995.

[4] J. Princen, A. Johnson, and A. Bradley, "Subband/transform coding using filter bank designs based on time domain aliasing cancellation," in ICASSP '87. IEEE International Conference on Acoustics. Speech, and Signal Processing, April 1987, vol. 12, pp. 2161-2164.

[5] Christian Helmrich, Efficient Perceptual Audio Coding Using Cosine and Sine Modulated Lapped Transforms, doctoral thesis, Friedrich-Alexander-Universität Erlangen-Nürnberg (FAU), 2017, Chapter 3.3: Frequency-Domain Prediction with Very Low Complexity.

[6] J. Rothweiler. "Polyphase quadrature filters-a new subband coding technique," in ICASSP '83. IEEE International C01iference on Acoustics, Speech, and Signal Processing, April 1983, vol. 8, pp. 1280-1283.

[7] Albrecht Schneider and Klaus Frieler, "Perception of harmonic and inharmonic sounds: Results from ear models;—in Computer Music Modeling and Retrieval. Genesis of Meaning in Sound and Music, Solvi Ystad, Richard Kronland-Martinet, and Kristoffer Jensen, Eds., Berlin, Heidelberg, 2009, pp. 18-44, Springer Berlin Heidelberg.

[8] Hugo Fastl and Eberhard Zwicker, Psychoacoustics: Facts and Models, Springer-Verlag, Berlin, Heidelberg, 2006, Chapter 7.2: Just-Noticeable Changes in Frequency.

[9] John P. Princen and Alan Bernard Bradley, "Analysis/synthesis filter bank design based on time domain aliasing cancellation," IEEE Transactions on Acoustics, Speech, and Signal Processing, vol. 34, no. 5, pp. 1153-1161, October 1986.

[10] Alain de Cheveign and Hideki Kawahara, "Yin, a fundamental frequency estimator for speech and music;—The Journal of the Acoustical Society of America, vol. 111, pp. 1917-30, 05 2002.

[11] Armin Taghipour, Psychoacoustics of detection of tonality and asymmetry of masking: implementation of tonality estimation methods in a psychoacoustic model for perceptual audio coding, doctoral thesis, Friedrich-Alexander-Universität Erlangen-Nürnberg (FAU), 2016, Chapter 4: The Psychoacoustic model.

[12] J. D. Johnston, "Estimation of perceptual entropy using noise masking criteria," in ICASSP-88, International Conference on Acoustics, Speech, and Signal Processing, April 1988, pp. 2524-2527 vol. 5.

[13] WO 2016 142357 A1, published September 2016.

The invention claimed is:

1. An apparatus, comprising:

an encoder comprising instructions executed by a processor and configured to encode a current frame of an audio signal based on one or more previous frames of the audio signal, wherein the one or more previous frames of the audio signal precede the current frame, and, wherein each of the current frame and the one or more previous frames comprises one or more harmonic components and a plurality of spectral coefficients in a frequency domain or in a transform domain;

wherein the encoder configured to:

determine an encoding of the current frame that facilitates decoding by a decoder to reconstruct audio content of the current frame for playback via one or more loudspeakers;

estimate two harmonic parameters for each of the one or more harmonic components of a most previous frame among the one or more previous frames;

determine the estimation of the two harmonic parameters for each of the one or more harmonic components of the most previous frame based on a first group of three or more of the plurality of spectral coefficients from each of the one or more previous frames;

compute a gain factor and a residual signal for encoding of the current frame, wherein the gain factor and the residual signal are determined based on a fundamental frequency of the one or more harmonic components of both the current frame and the one or more previous frames, as well as the estimated two harmonic parameters for each harmonic component of the most previous frame; and generate the encoding of the current frame, wherein the encoding of the current frame comprises the gain factor and the residual signal.

2. The encoder according to claim 1, wherein the encoder is to estimate the two harmonic parameters for each of the one or more harmonic components of the most previous frame without using a second group of one or more further spectral coefficients of the plurality of spectral coefficients of each of the one or more previous frames.

3. The encoder according to claim 1, wherein the encoder is to determine an estimation of the two harmonic parameters for each of one or more harmonic components of the current frame depending on the estimation of the two harmonic parameters for each of the one or more harmonic components of the most previous frame and depending on the fundamental frequency of the one or more harmonic components of the current frame and the one or more previous frames.

4. The encoder according to claim 1, wherein the two harmonic parameters for each of the one or more harmonic components are a first parameter for a cosinus sub-component and a second parameter for a sinus sub-component for each of the one or more harmonic components.

5. The encoder according to claim 1, wherein the encoder is to estimate the two harmonic parameters for each of the one or more harmonic components of the most previous frame by solving a linear equation system comprising at least three equations, wherein each of the at least three equations depends on a spectral coefficient of the first group of the three or more of the plurality of spectral coefficients of each of the one or more previous frames.

6. The encoder according to claim 5, wherein the encoder is to solve the linear equation system using a least mean squares algorithm.

7. The encoder according to claim 5, wherein the linear equation system is defined by $$X_{m\text{-}1}(\Lambda)=U\cdot p\in\mathbb{R}^{(\gamma_H-\gamma_1+2r+1)\times 1}$$

wherein $$\Lambda=[\gamma_1-r,\ \ldots\ ,\gamma_H-r]\in\mathbb{R}^{(\gamma_H-\gamma_1+2r+1)\times 1}$$

wherein $\gamma_1$ indicates a first spectral band of one of the one or more harmonic components of the most previous frame comprising a lowest harmonic component frequency among the one or more harmonic components, wherein $\gamma_H$ indicates a second spectral band of one of the one or more harmonic components of the most previous frame comprising a highest harmonic component frequency among the one or more harmonic components, wherein r is an integer number with $r\geq 0$.

8. The encoder according to claim 7, wherein $r\geq 1$.

9. The encoder according to claim 7, wherein $$U=[U_1,U_2,\ \ldots\ ,U_H]\in\mathbb{R}^{(\gamma_H-\gamma_1+2r+1)\times 2H}$$

$$p=[p_1,p_2,\ \ldots\ ,p_H]^T\in\mathbb{R}^{2H\times 1}$$

wherein $$p_h=[a_h,b_h]^T\in\mathbb{R}^{2\times 1}$$

wherein $a_h$ is a parameter for a cosinus sub-component for an h-th harmonic component of the most previous frame, wherein $b_h$ is a parameter for a sinus sub-component for the h-th harmonic component of the most previous frame, wherein, for each integer value with $1\leq h\leq H$:

$$U_h=\frac{F(\Upsilon_1)}{2}\left[\cos\left(\frac{3N\Upsilon_1}{2}\right),\ \sin\left(\frac{3N\Upsilon_1}{2}\right)\right]+\frac{F(\Upsilon_2)}{2}\left[\cos\left(\frac{3N\Upsilon_2}{2}\right),\ \sin\left(\frac{3N\Upsilon_2}{2}\right)\right]\in\mathbb{R}^{(2r+1)\times 2},$$

wherein $$\Upsilon_1=\omega_h-\kappa_{\Gamma_h}^T\in\mathbb{R}^{(2r+1)\times 1},$$

$$\Upsilon_2=\omega_h+\kappa_{\Gamma_h}^T\in\mathbb{R}^{(2r+1)\times 1},$$

wherein $$F(\lambda)=\mathcal{DFT}\{f(n)\}e^{j\lambda(N-0.5)}$$

wherein $f(n)$ is a window function in a time domain, wherein DFT is Discrete Fourier Transform, wherein $$\kappa_k=\frac{\pi}{N}\left(k+\frac{1}{2}\right),$$

wherein $$w_h=h\cdot\frac{2\pi f_0}{f_s},$$

wherein $f_0$ is the fundamental frequency of the one or more harmonic components of the current frame and the one or more previous frames, wherein $f_s$ is a sampling frequency, and wherein N depends on a length of a transform block for transforming the time-domain audio signal into the frequency domain or into the spectral domain.

10. The encoder according to claim 5, wherein the linear equation system is solvable according to:

$$\tilde{p}=U^{+}\cdot X_{m\text{-}1}(\Lambda)$$

wherein $\tilde{p}$ is a first vector comprising an estimation of the two harmonic parameters for each of the one or more harmonic components of the most previous frame, wherein $X_{m-1}(\Lambda)$ is a second vector comprising the first group of the three or more of the plurality of spectral coefficients of each of the one or more previous frames, wherein $U^+$ is a Moore-Penrose inverse matrix of $U=[U_1, U_2, \ldots, U_H]$, wherein U comprises a number of third matrices or third vectors, wherein each of the third matrices or third vectors together with the estimation of the two harmonic parameters for a harmonic component of the one or more harmonic components of the most previous frame indicates an estimation of said harmonic component, wherein H indicates a number of the harmonic components of the one or more previous frames.

11. The encoder according to claim 1, wherein the encoder is to encode a fundamental frequency of harmonic components, a window function, the gain factor and the residual signal.

12. The encoder according to claim 11, wherein the encoder is to determine the number of the one or more harmonic components of the most previous frame before estimating the two harmonic parameters for each of the one or more harmonic components of the most previous frame using a first group of three or more of the plurality of spectral coefficients of each of the one or more previous frames of the audio signal.

13. The encoder according to claim 12, wherein the encoder is to determine one or more groups of harmonic components from the one or more harmonic components, and to apply a prediction of the audio signal on the one or more groups of harmonic components, wherein the encoder is to encode the order for each of the one or more groups of harmonic components of the most previous frame.

14. The encoder according to claim 1, wherein the encoder is to determine the two harmonic parameters for each of one or more harmonic components of the current frame depending on the two harmonic parameters for each of said one of the one or more harmonic components of the most previous frame.

15. The encoder according to claim 14, wherein the encoder is to apply:

$$c_h = a_h \cos(\omega_h N) + b_h \sin(\omega_h N), \text{ and}$$

wherein the encoder is to apply:

$$d_h = a_h \sin(\omega_h N) + b_h \cos(\omega_h N)$$

wherein $a_h$ is a parameter for a cosinus sub-component for the h-th harmonic component of said one or more harmonic components of the most previous frame, wherein $b_h$ is a parameter for a sinus sub-component for the h-th harmonic component of said one or more harmonic components of the most previous frame, wherein $c_h$ is a parameter for a cosinus sub-component for the h-th harmonic component of said one or more harmonic components of the current frame, wherein $d_h$ is a parameter for a sinus sub-component for the h-th harmonic component of said one or more harmonic components of the current frame, wherein N depends on a length of a transform block for transforming the time-domain audio signal into the frequency domain or into the spectral domain, and wherein $$w_h = h \cdot \frac{2\pi f_0}{f_s},$$

wherein $f_0$ is the fundamental frequency of the one or more harmonic components of the most previous frame, being a fundamental frequency of the one or more harmonic components of the current frame, wherein $f_s$ is a sampling frequency, and wherein h is an index indicating one of the one or more harmonic components of the most previous frame.

16. The encoder according to claim 1, wherein the encoder is to determine the residual signal depending on the plurality of spectral coefficients of the current frame in the frequency domain or in the transform domain and depending on the estimation of the two harmonic parameters for each of one or more harmonic components of the current frame, and wherein the encoder is to encode the residual signal.

17. The encoder according to claim 16, wherein the encoder is to determine a spectral prediction of one or more of the plurality of spectral coefficients of the current frame depending on the estimation of the two harmonic parameters for each of the one or more harmonic components of the current frame, and wherein the encoder is to determine the residual signal and a gain factor depending on the plurality of spectral coefficients of the current frame in the frequency domain or in the transform domain and depending on the spectral prediction of the three or more of the plurality of spectral coefficients of the current frame, wherein the encoder is to encode the order for each of the one or more groups of harmonic components of the most previous frame.

18. The encoder according to claim 17, wherein the encoder is to determine the residual signal of the current frame according to:

$$R_m(k) = X_m(k) - g\tilde{X}_m(k), 0 \le k \le N.$$

wherein m is a frame index, wherein k is a frequency index, wherein $R_m(k)$ indicates a k-th sample of the residual signal in the spectral domain or in the transform domain, wherein $X_m(k)$ indicates a k-th sample of the spectral coefficients of the current frame in the spectral domain or in the transform domain, wherein $\tilde{X}_m(k)$ indicates a k-th sample of the spectral prediction of the current frame in the spectral domain or in the transform domain, and wherein g is the gain factor.

19. The encoder according to claim 1, wherein the encoder is configured to be operated in a first mode and is configured to be operated in at least one of a second mode and a third mode and a fourth mode, wherein, if the encoder is in the first mode, the encoder is to encode the current frame by determining the estimation of the two harmonic parameters for each of the one or more harmonic components of the most previous frame using the first group of three or more of the plurality of spectral coefficients of each of the one or more previous frames of the audio signal, wherein, if the encoder is in the second mode, the encoder is to encode the audio signal in the transform domain or in the filter-bank domain, and the encoder is configured to determine the plurality of spectral coefficients of the audio signal for the current frame and for at least the most previous frame, wherein the encoder is configured to selectively apply predictive encoding to a plurality of individual spectral coefficients or groups of spectral coefficients, the encoder is configured to determine a spacing value, the encoder is configured to select the plurality of individual spectral coefficients or groups of spectral coefficients to which predictive encoding is applied based on the spacing value, wherein, if the encoder is in the third mode, the encoder is to encode the audio signal by employing Time Domain Long-term Prediction, and wherein, if the encoder is in the fourth mode, the encoder is to encode the audio signal by employing Adaptive Modified Discrete Cosine Transform Long-Term Prediction, wherein, if the encoder employs Adaptive Modified Discrete Cosine Transform Long-Term Prediction, the encoder is configured to select either Time Domain Long-term Prediction or Frequency Domain Prediction or Frequency Domain Least Mean Square Prediction as a prediction method on a frame basis depending on a minimization criteria.

20. The encoder according to claim 19, wherein, in each of the first mode and the second mode and the third mode and the fourth mode, the encoder is to refine the fundamentally frequency to acquire a refined fundamental frequency and is to adapt the gain factor to acquire an adapted gain factor on a frame basis depending on a minimization criteria, wherein the encoder is to encode the refined fundamental frequency and the adapted gain factor instead of the original fundamental frequency and gain factor.

21. The encoder according to claim 19, wherein the encoder is to set itself into the first mode or into at least one of the second mode and the third mode and the fourth mode, and wherein the encoder is to encode, whether the current frame has been encoded in the first mode or in the second mode or in the third mode or in the fourth mode.

22. An apparatus, comprising:

a decoder comprising instructions executed by a processor and configured to reconstruct a current frame of an audio signal, wherein audio content of the reconstructed current frame is playable by one or more loudspeakers;

wherein the audio signal includes one or more previous frames that precede the current frame, each of the current previous frames comprising one or more harmonic components a plurality of spectral coefficients in a frequency domain or a transform domain, wherein the decoder is configured to:

receive an encoded representation of the current frame, determine an estimation of two harmonic parameters for each harmonic component of a most previous frame, wherein the estimation is based on a first group of three or more reconstructed spectral coefficients for each of the one or more previous frames;

reconstruct the current frame based on the encoded representation and the estimated harmonic parameters;

receive the encoded representation of the current frame, which includes a gain factor and a residual signal; and reconstruct the current frame based on the gain factor, the residual signal, and a fundamental frequency of the harmonic components in the current and previous frames.

23. The decoder according to claim 22, wherein the two harmonic parameters for each of the one or more harmonic components of the most previous frame do not depend on a second group of one or more further spectral coefficients of the plurality of reconstructed spectral coefficients for each of the one or more previous frames.

24. The decoder according to claim 22, wherein the decoder is to determine an estimation of the two harmonic parameters for each of one or more harmonic components of the current frame depending on the estimation of the two harmonic parameters for each of the one or more harmonic components of the most previous frame and depending on the fundamental frequency of the one or more harmonic components of the current frame and the one or more previous frames.

25. The decoder according to claim 22, wherein the two harmonic parameters for each of the one or more harmonic components are a first parameter for a cosinus sub-component and a second parameter for a sinus sub-component for each of the one or more harmonic components.

26. The decoder according to claim 22, wherein the two harmonic parameters for each of the one or more harmonic components of the most previous frame depend on a linear equation system comprising at least three equations, wherein each of the at least three equations depends on a spectral coefficient of the first group of the three or more of the plurality of reconstructed spectral coefficients for each of the one or more previous frames.

27. The decoder according to claim 26, wherein the linear equation system is solvable using a least mean squares algorithm.

28. The decoder according to claim 26, wherein the linear equation system is defined by $$X_{m-1}(\Lambda)=U\cdot p\in \mathbb{R}^{(\gamma_H-\gamma_1+2r+1)\times 1}$$

wherein $$\Lambda=[\gamma_1-r, \ldots ,\gamma_H-r]\in \mathbb{R}^{(\gamma_H-\gamma_1+2r+1)\times 1}$$

wherein $\gamma_1$ indicates a first spectral band of one of the one or more harmonic components of the most previous frame comprising a lowest harmonic component frequency among the one or more harmonic components, wherein $\gamma_H$ indicates a second spectral band of one of the one or more harmonic components of the most previous frame comprising a highest harmonic component frequency among the one or more harmonic components, wherein r is an integer number with $r\geq 0$.

29. The decoder according to claim 28, wherein $r\geq 1$.

30. The decoder according to claim 28, wherein $$U=[U_1,U_2, \ldots ,U_H]\in \mathbb{R}^{(\gamma_H-\gamma_1+2r+1)\times 2H}$$

$$p=[p_1,p_2, \ldots ,p_H]^T\in \mathbb{R}^{2H\times 1}$$

wherein $$p_h=[a_h,b_h]^T\in \mathbb{R}^{2\times 1}$$

wherein $a_h$ is a parameter for a cosinus sub-component an h-th harmonic component of the most previous frame, wherein $b_h$ is a parameter for a sinus sub-component for the h-th harmonic component of the most previous frame, wherein, for each integer value with $1\leq h\leq H$:

$$U_h = \frac{F(Y_1)}{2}\left[\cos\left(\frac{3NY_1}{2}\right), \sin\left(\frac{3NY_1}{2}\right)\right] +$$

-continued $$\frac{F(\Upsilon_2)}{2}\left[\cos\left(\frac{3N\Upsilon_2}{2}\right), \sin\left(\frac{3N\Upsilon_2}{2}\right)\right] \in \mathbb{R}^{(2r+1)\times 2},$$

wherein $$\Upsilon_1 = \omega_h - \kappa_{\Gamma_h}^T \in \mathbb{R}^{(2r+1)\times 1},$$

$$\Upsilon_2 = \omega_h + \kappa_{\Gamma_h}^T \in \mathbb{R}^{(2r+1)\times 1},$$

wherein $$F(\lambda) = \mathcal{DFT}\{f(n)\}e^{j\lambda(N-0.5)}$$

wherein $f(n)$ is a window function in a time domain, wherein DFT is Discrete Fourier Transform, wherein $$\kappa_k = \frac{\pi}{N}\left(k + \frac{1}{2}\right),$$

wherein $$w_h = h \cdot \frac{2\pi f_0}{f_s},$$

wherein $f_0$ is the fundamental frequency of the one or more harmonic components of the current frame and the one or more previous frames, wherein $f_s$ is a sampling frequency, and wherein N depends on a length of a transform block for transforming the time-domain audio signal into the frequency domain or into the spectral domain.

31. The decoder according to claim 26, wherein the linear equation system is solvable according to:

$$\tilde{p} = U^{+} \cdot X_{m-1}(\Lambda)$$

wherein $\tilde{p}$ is a first vector comprising an estimation of the two harmonic parameters for each of the one or more harmonic components of the most previous frame, wherein $X_{m-1}(\Lambda)$ is a second vector comprising the first group of the three or more of the plurality of reconstructed spectral coefficients for each of the one or more previous frames, wherein $U^{+}$ is a Moore-Penrose inverse matrix of $U=[U_1, U_2, \ldots, U_H]$, wherein U comprises a number of third matrices or third vectors, wherein each of the third matrices or third vectors together with the estimation of the two harmonic parameters for a harmonic component of the one or more harmonic components of the most previous frame indicates an estimation of said harmonic component, wherein H indicates a number of the harmonic components of the one or more previous frames.

32. The decoder according to claim 22, wherein the decoder is to receive a fundamental frequency of harmonic components, a window function, the gain factor and the residual signal, wherein the decoder is to reconstruct the current frame depending on the fundamental frequency of the one or more harmonic components of the most previous frame, depending on the window function, depending on the gain factor and depending on the residual signal.

33. The decoder according to claim 32, wherein the decoder is to receive the number of the one or more harmonic components of the most previous frame, and wherein the decoder is to decode the encoding of the current frame depending on the number of the one or more harmonic components of the most previous frame.

34. The decoder according to claim 33, wherein the decoder is to decode the encoding of the current frame depending on one or more groups of harmonic components, wherein the decoder is to apply a prediction of the audio signal on the one or more groups of harmonic components.

35. The decoder according to claim 22, wherein the decoder is to determine the two harmonic parameters for each of one or more harmonic components of the current frame depending on the two harmonic parameters for each of said one of the one or more harmonic components of the most previous frame.

36. The decoder according to claim 35, wherein the decoder is to apply:

$$c_h = a_h \cos(\omega_h N) + b_h \sin(\omega_h N), \text{ and}$$

wherein the decoder is to apply:

$$d_h = a_h \sin(\omega_h N) + b_h \cos(\omega_h N),$$

wherein $a_h$ is a parameter for a cosinus sub-component for the h-th harmonic component of the one or more harmonic components of the most previous frame, wherein $b_h$ is a parameter for a sinus sub-component for the h-th harmonic component of the one or more harmonic components of the most previous frame, wherein $c_h$ is a parameter for a cosinus sub-component for the h-th harmonic component of the one or more harmonic components of the current frame, wherein $d_h$ is a parameter for a sinus sub-component for the h-th harmonic component of the one or more harmonic components of the current frame, wherein N depends on a length of a transform block for transforming the time-domain audio signal into the frequency domain or into the spectral domain, and wherein $$w_h = h \cdot \frac{2\pi f_0}{f_s},$$

wherein $f_0$ is the fundamental frequency of the one or more harmonic components of the most previous frame, being a fundamental frequency of the one or more harmonic components of the current frame, wherein $f_s$ is a sampling frequency, and wherein h is an index indicating one of the one or more harmonic components of the most previous frame.

37. The decoder according to claim 22, wherein the decoder is to receive the residual signal, wherein the residual signal depends on the plurality of spectral coefficients of the current frame in the frequency domain or in the transform domain, and wherein the residual signal depends on the estimation of the two harmonic parameters for each of one or more harmonic components of the current frame.

38. The decoder according to claim 37, wherein the decoder is to determine a spectral prediction of one or more of the plurality of spectral coefficients of the current frame depending on the estimation of the two harmonic parameters for each of the one or more harmonic components of the current frame, and wherein the decoder is to determine the current frame of the audio signal depending on the spectral prediction of the current frame and depending on the residual signal and depending on a gain factor.

39. The decoder according to claim 38, wherein the residual signal of the current frame is defined according to:

$$\hat{X}_m(k)=\hat{R}_m(k)+g\tilde{X}_m(k)$$

wherein m is a frame index, wherein k is a frequency index, wherein $\hat{R}_m(k)$ is the received residual after quantization reconstruction, wherein $\hat{X}_m(k)$ is the reconstructed current frame, wherein $\tilde{X}_m(k)$ indicates the spectral prediction of the current frame in the spectral domain or in the transform domain, and wherein g is the gain factor.

40. The decoder according to claim 22, wherein the decoder is configured to be operated in a first mode and is configured to be operated in at least one of a second mode and a third mode and a fourth mode, wherein, if the decoder is in the first mode, the decoder is to determine the estimation of the two harmonic parameters for each of the one or more harmonic components of the most previous frame, wherein the two harmonic parameters for each of the one or more harmonic components of the most previous frame depend on a first group of three or more of the plurality of reconstructed spectral coefficients for each of the one or more previous frames of the audio signal, and the decoder is to decode the encoding of the current frame depending on the estimation of the two harmonic parameters for each of the one or more harmonic components of the most previous frame, wherein, if the decoder is in the second mode, the decoder is to parse an encoding of the audio signal to acquire encoded spectral coefficients of the audio signal for the current frame and for at least the most previous frame, and the decoder is configured to selectively apply predictive decoding to a plurality of individual encoded spectral coefficients or groups of encoded spectral coefficients, wherein the decoder is configured to acquire a spacing value, wherein the decoder is configured to select the plurality of individual encoded spectral coefficients or groups of encoded spectral coefficients to which predictive decoding is applied based on the spacing value, wherein, if the decoder is in the third mode, the decoder is to decode the audio signal by employing Time Domain Long-term Prediction, and wherein, if the decoder is in the fourth mode, the decoder is to decode the audio signal by employing Adaptive Modified Discrete Cosine Transform Long-Term Prediction, wherein, if the decoder employs Adaptive Modified Discrete Cosine Transform Long-Term Prediction, the decoder is configured to select either Time Domain Long-term Prediction or Frequency Domain Prediction or Frequency Domain Least Mean Square Prediction as a prediction method on a frame basis depending on a minimization criteria.

41. The decoder according to claim 40, wherein, in each of the first mode and the second mode and the third mode and the fourth mode, the decoder is to decode the audio signal depending on a refined fundamental frequency and depending on an adapted gain factor, which have been determined on a frame basis.

42. The decoder according to claim 40, wherein the decoder is to receive and decode an encoding comprising an indication on whether the current frame has been encoded in the first mode or in the second mode or in the third mode or in the fourth mode, and wherein the decoder is to set itself into the first mode or into the second mode or into the third mode or into the fourth mode depending on the indication.

43. An apparatus for frame loss concealment in an audio signal, wherein the audio signal comprises a current frame and one or more previous frames preceding the current frame each frame including one or more harmonic components and a plurality of spectral coefficients in either a frequency domain or in a transform domain;

wherein the apparatus comprises instructions executed by a processor and is configured to:

determine an estimation of two harmonic parameters of a most recent previous frame, wherein the estimation is based on a first group of three or more reconstructed spectral coefficients from the one or more previous frames;

receive an encoding of the current frame, the encoding comprising a gain factor and a residual signal, wherein the gain factor and residual signal are dependent on a fundamental frequency of the harmonic components in the current and previous frames and on the two harmonic parameters of each harmonic component of the most recent previous frame;

reconstruct the current frame based on the estimated harmonic parameters when the current frame is not received or is received in a corrupted state; and enable playback of the reconstructed audio content of the current frame through one or more loudspeakers.

44. The apparatus according to claim 43, wherein the apparatus is to receive the number of the one or more harmonic components of the most previous frame, and wherein the apparatus is to decode the encoding of the current frame depending on the number of the one or more harmonic components of the most previous frame and depending on a fundamental frequency of the one or more harmonic components of the current frame and of the one or more previous frames.

45. The apparatus according to claim 43, wherein, to reconstruct the current frame, the apparatus is to determine an estimation of the two harmonic parameters for each of one or more harmonic components of the current frame depending on the estimation of the two harmonic parameters for each of the one or more harmonic components of the most previous frame.

46. The apparatus according to claim 45, wherein the decoder is to determine the two harmonic parameters for each of the one or more harmonic components of the current frame depending on the two harmonic parameters for each of said one of the one or more harmonic components of the most previous frame.

47. The apparatus according to claim 46, wherein the apparatus is to apply:

$$c_h=a_h\cos(\omega_h N)+b_h\sin(\omega_h N),\text{ and}$$

wherein the apparatus is to apply:

$$d_h=a_h\sin(\omega_h N)+b_h\cos(\omega_h N),$$

wherein $a_h$ is a parameter for a cosinus sub-component for an h-th harmonic component of the one or more harmonic components of the most previous frame, wherein $b_h$ is a parameter for a sinus sub-component for the h-th harmonic component of the one or more harmonic components of the most previous frame, wherein $c_h$ is a parameter for a cosinus sub-component h-th harmonic component of the one or more harmonic components of the current frame, wherein $d_h$ is a parameter for a sinus sub-component for the h-th harmonic component of the one or more harmonic components of the current frame, wherein N depends on a length of a transform block for transforming the time-domain audio signal into the frequency domain or into the spectral domain, and wherein $$w_h = h \cdot \frac{2\pi f_0}{f_s},$$

wherein $f_0$ is the fundamental frequency of the one or more harmonic components of the most previous frame, being a fundamental frequency of the one or more harmonic components of the current frame, wherein $f_s$ is a sampling frequency, and wherein h is an index indicating one of the one or more harmonic components of the most previous frame.

48. The apparatus according to claim 46, wherein the apparatus is to determine a spectral prediction of one or more of the plurality of spectral coefficients of the current frame depending on the estimation of the two harmonic parameters for each of the one or more harmonic components of the current frame.

49. A system, comprising:

an encoder comprising instructions executed by a processor for encoding a current frame of an audio signal depending on one or more previous frames of the audio signal, wherein the one or more previous frames precede the current frame, wherein each of the current frame and the one or more previous frames comprises one or more harmonic components of the audio signal, wherein each of the current frame and the one or more previous frames comprises a plurality of spectral coefficients in a frequency domain or in a transform domain, wherein, to generate an encoding of the current frame, the encoder is to determine an estimation of two harmonic parameters for each of the one or more harmonic components of a most previous frame of the one or more previous frames, wherein the encoder is to determine the estimation of the two harmonic parameters for each of the one or more harmonic components of the most previous frame using a first group of three or more of the plurality of spectral coefficients of each of the one or more previous frames of the audio signal; and a decoder according to claim 22 for decoding an encoding of the current frame of the audio signal.

50. A method for encoding a current frame of an audio signal based on one or more previous frames, wherein the current frame can be decoded to reconstruct audio content for playback by one or more loudspeakers, the method comprising:

receiving an audio signal comprising a current frame and one or more previous frame, wherein each frame includes one or more harmonic components and a plurality of spectral coefficients in a frequency domain or in a transform domain, determining an estimation of two harmonic parameters for each of the one or more harmonic components of a most previous frame of the one or more previous frames, wherein determining the estimation of the two harmonic parameters for each harmonic component of a most previous frame, wherein the estimation is based a first group of three or more of the plurality of spectral coefficients from the one or more previous frames;

determining a gain factor and a residual signal as part of the encoding of the current frame, wherein the gain factor and residual signal are based on a fundamental frequency of the harmonic components in the current and previous frames and on the estimated harmonic parameters of the most recent previous frame; and generating the encoding of the current frame, wherein the encoding comprises the gain factor and the residual signal for use in decoding.

51. A method for reconstructing a current frame of an audio signal for playback by one or more loudspeakers, the method comprising:

receiving an encoded representation of the current frame, wherein the audio signal comprises the current frame and one or more previous frames, each frame including one or more harmonic components and a plurality of spectral coefficients in a frequency domain or a transform domain, determining an estimation of two harmonic parameters for each harmonic component of a most recent previous, wherein the estimation is based on a first group of three or more reconstructed spectral coefficients from the one or more previous frames;

reconstructing the current frame based on the encoded representation and the estimated harmonic parameters of the most recent previous frame;

receiving an encoded representation of the current frame comprising a gain factor and a residual signal; and reconstructing the current frame based on the gain factor, the residual signal, and a fundamental frequency of the harmonic components in the current and previous frames.

52. A method for frame loss concealment in an audio signal, the method comprising:

receiving an audio signal comprising a current frame and one or more previous frames, each frame including one or more harmonic components and a plurality of spectral coefficients in a frequency domain or in a transform domain, determining an estimation of two harmonic parameters for each harmonic component of a most recent previous frame, wherein the estimation is based on a first group of three or more reconstructed spectral coefficients from the one or more previous frames;

reconstructing the current frame based on the estimated harmonic parameters when the current frame is not received or is in a corrupted state;

receiving an encoded representation of the current frame comprising a gain factor and a residual signal; and reconstructing the current frame based on the gain factor, the residual signal, and a fundamental frequency of the harmonic components in the current and previous frames, thereby enabling playback of the reconstructed audio content through one or more loudspeakers.

53. A non-transitory digital storage medium storing a computer program that, when executed by a computer, performs a method for encoding a current frame of an audio signal, the method comprising:

receiving an audio signal comprising a current frame and one or more previous frames, wherein each frame includes one or more harmonic components and a plurality of spectral coefficients in a frequency domain or in a transform domain;

determining an estimation of two harmonic parameters for each harmonic component of a most recent previous frame, wherein the estimation is based on a first group of three or more spectral coefficients from the one or more previous frames;

determining a gain factor and a residual signal for encoding the current frame, wherein the gain factor and residual signal are based on a fundamental frequency of the harmonic components in the current and previous frames and on the estimated harmonic parameters of the most recent previous frame; and generating an encoded representation of the current frame, wherein the encoding includes the gain factor and the residual signal for subsequent decoding and playback by one or more loudspeakers.

54. A non-transitory digital storage medium a computer program that, when executed by a computer, performs a method for reconstructing a current frame of an audio signal, the method comprising:

receiving an encoded representation of a current frame of the audio signal wherein the audio signal comprises the current frame and one or more previous frames, each frame including one or more harmonic components and a plurality of spectral coefficients in a frequency domain or a transform domain, determining an estimation of two harmonic parameters for each harmonic component of a most recent previous frame, wherein the estimation is based on a first group of three or more of reconstructed spectral coefficients from the one or more previous frames;

reconstructing the current frame based on the encoded representation and the estimated harmonic parameters of the most recent previous frame;

determining a gain factor and a residual signal as part of the encoding of the current frame, wherein the gain factor and residual signal are based on a fundamental frequency of the harmonic components in the current and previous frames and on the estimated harmonic parameters of the most recent previous frame; and generating an encoded representation of the current frame, wherein the encoding includes the gain factor and the residual signal for subsequent decoding and playback by one or more loudspeakers.

55. A non-transitory digital storage medium storing a computer program that, when executed by a computer, performs a method for frame loss concealment in an audio signal, the method comprising:

receiving an audio signal comprising a current frame and one or more previous frames, wherein the one or more previous frames precede the current frame, and wherein each frame includes one or more harmonic components a plurality of spectral coefficients in a frequency domain or in a transform domain;

determining an estimation of two harmonic parameters for each harmonic component of a most recent previous frame, wherein the estimation is based on a first group of three or more reconstructed spectral coefficients from the one or more previous frames;

determining a gain factor and a residual signal as part of the encoding of the current frame, wherein the gain factor and residual signal are based on a fundamental frequency of the harmonic components in the current and previous frames and on the estimated harmonic parameters of the most recent previous frame;

generating an encoded representation of the current frame, wherein the encoding includes the gain factor and the residual signal;

if the current frame is not received or is received in a corrupted state, reconstructing the current frame based on the estimated harmonic parameters of the most recent previous frame;

enabling playback of the reconstructed audio content through one or more loudspeaker.

* * * * *